US012571578B2

(12) United States Patent
Kim et al.

(10) Patent No.: US 12,571,578 B2
(45) Date of Patent: Mar. 10, 2026

(54) REFRIGERATOR WITH AUTOMATIC DOOR AND METHOD FOR CONTROLLING AUTOMATIC DOOR OF REFRIGERATOR

(71) Applicant: LG Electronics Inc., Seoul (KR)

(72) Inventors: Hyunbum Kim, Seoul (KR); Seungyoon Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 18/276,595

(22) PCT Filed: Feb. 8, 2022

(86) PCT No.: PCT/KR2022/001898
§ 371 (c)(1),
(2) Date: Aug. 9, 2023

(87) PCT Pub. No.: WO2022/173188
PCT Pub. Date: Aug. 18, 2022

(65) Prior Publication Data

US 2024/0125541 A1 Apr. 18, 2024

(30) Foreign Application Priority Data

Feb. 9, 2021 (KR) ........................ 10-2021-0018425

(51) Int. Cl.
*F25D 23/02* (2006.01)
*E05F 15/611* (2015.01)
*F25D 29/00* (2006.01)

(52) U.S. Cl.
CPC .......... *F25D 23/028* (2013.01); *E05F 15/611* (2015.01); *F25D 29/005* (2013.01); *E05Y 2900/31* (2013.01); *F25D 2700/02* (2013.01)

(58) Field of Classification Search
CPC .. F25D 23/028; F25D 2700/02; F25D 29/005; F25D 23/02; E05F 15/616;
(Continued)

(56) References Cited

U.S. PATENT DOCUMENTS 10,648,218 B1 * 5/2020 Schroeder ............. F25D 23/028
2011/0048060 A1 * 3/2011 Kim .................... E05B 17/0029
62/449
(Continued)

FOREIGN PATENT DOCUMENTS

JP 2010025461 2/2010
KR 101447291 10/2014
(Continued)

OTHER PUBLICATIONS

KR 20180119028 translation (Year: 2018).*

*Primary Examiner* — Hiwot E Tefera
(74) *Attorney, Agent, or Firm* — Fish & Richardson P.C.

(57) ABSTRACT

A refrigerator includes: a door rotatably coupled to a main body and opening and closing a storage container defined in the main body, a door driver disposed at an upper portion of the main body and, based on the door being pressed, opening the door, a sensor comprising a magnetic field sensor and a magnet and detecting an open or closed state of the door and measuring a pressed amount of the door based on to a change in a distance between the magnetic field sensor and the magnet, and a controller controlling the door driver and determining whether the door is to be opened based on to the pressed amount of the door.

10 Claims, 26 Drawing Sheets

(58) Field of Classification Search
CPC ............. E05F 15/611; E05Y 2201/426; E05Y 2201/46; E05Y 2400/852; E05Y 2400/32; E05Y 2900/31; G01R 33/038; G01R 33/072
See application file for complete search history.

(56) References Cited

U.S. PATENT DOCUMENTS

| | | | | |
|---|---|---|---|---|
| 2011/0083461 | A1* | 4/2011 | Kim | E05F 15/619<br>62/449 |
| 2016/0040922 | A1* | 2/2016 | Ha | F25D 23/006<br>312/404 |
| 2017/0097185 | A1* | 4/2017 | Yasaka | E05F 15/614 |
| 2017/0260794 | A1* | 9/2017 | Son | E05F 15/614 |
| 2018/0128537 | A1* | 5/2018 | Kim | E05F 15/00 |
| 2018/0223582 | A1* | 8/2018 | Shin | E05F 15/619 |
| 2018/0283077 | A1* | 10/2018 | Lee | E05D 3/16 |
| 2018/0347892 | A1* | 12/2018 | Kim | E05F 15/619 |
| 2019/0162467 | A1* | 5/2019 | Lee | F25D 29/006 |
| 2020/0095818 | A1* | 3/2020 | Lee | F25D 29/005 |
| 2021/0254884 | A1* | 8/2021 | Hong | F25D 23/028 |

FOREIGN PATENT DOCUMENTS

| | | | |
|---|---|---|---|
| KR | 10-2018-0080080 | 7/2018 | |
| KR | 20180119028 A * | 11/2018 | E05F 15/614 |
| KR | 10-2018-0132390 | 12/2018 | |
| KR | 10-2020-0045798 | 5/2020 | |

* cited by examiner

[Fig. 1]
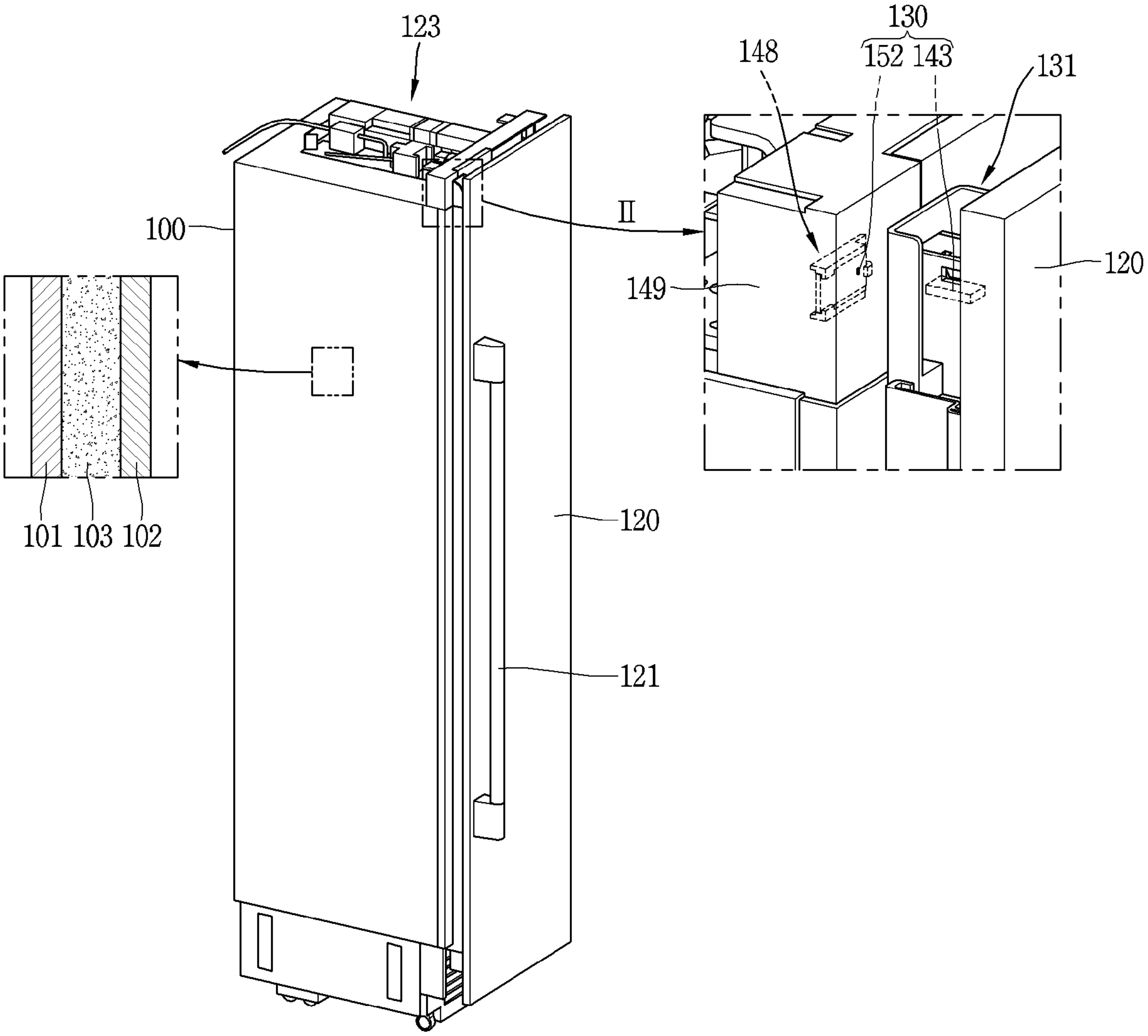

[Fig. 2]
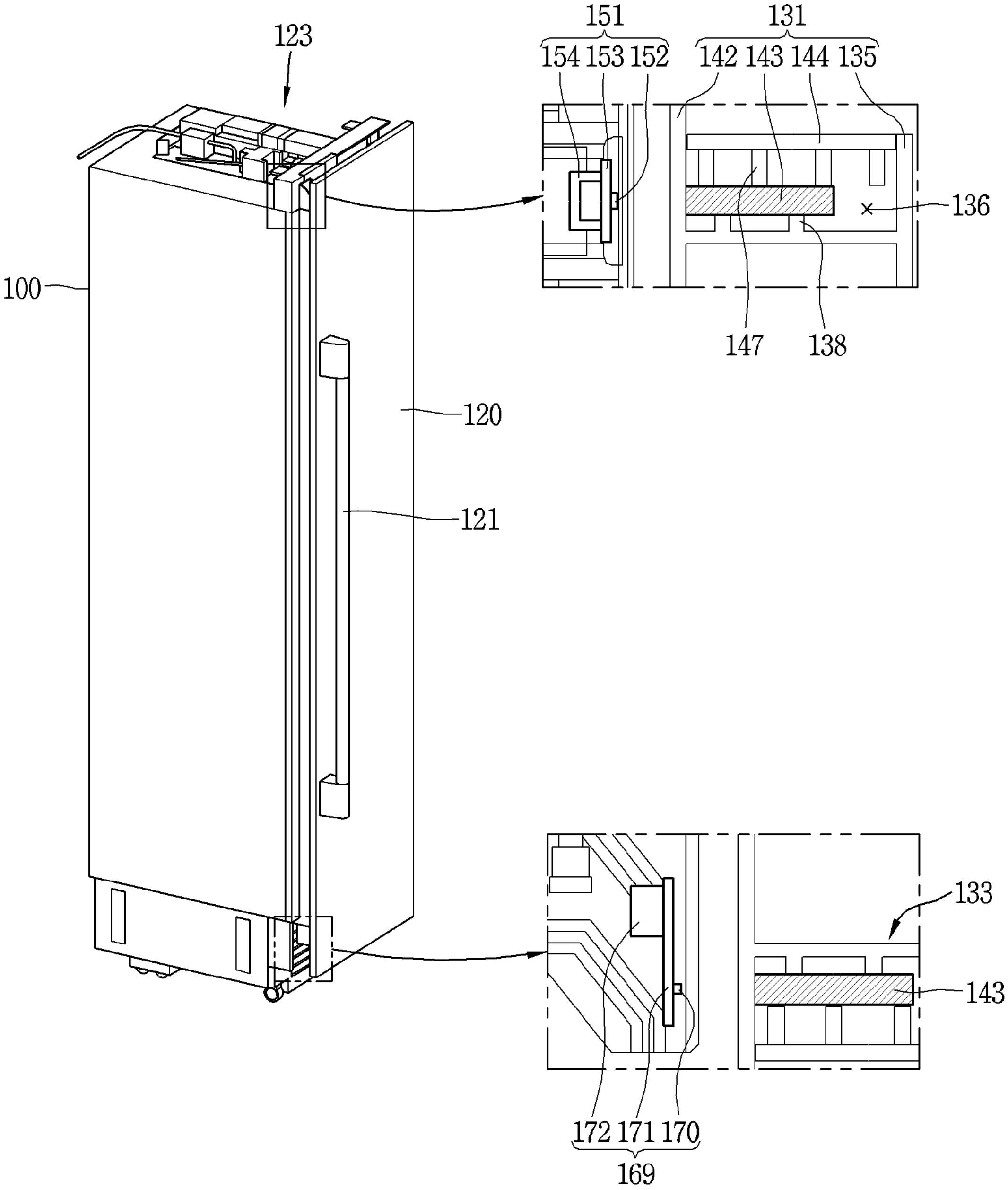

[Fig. 3]
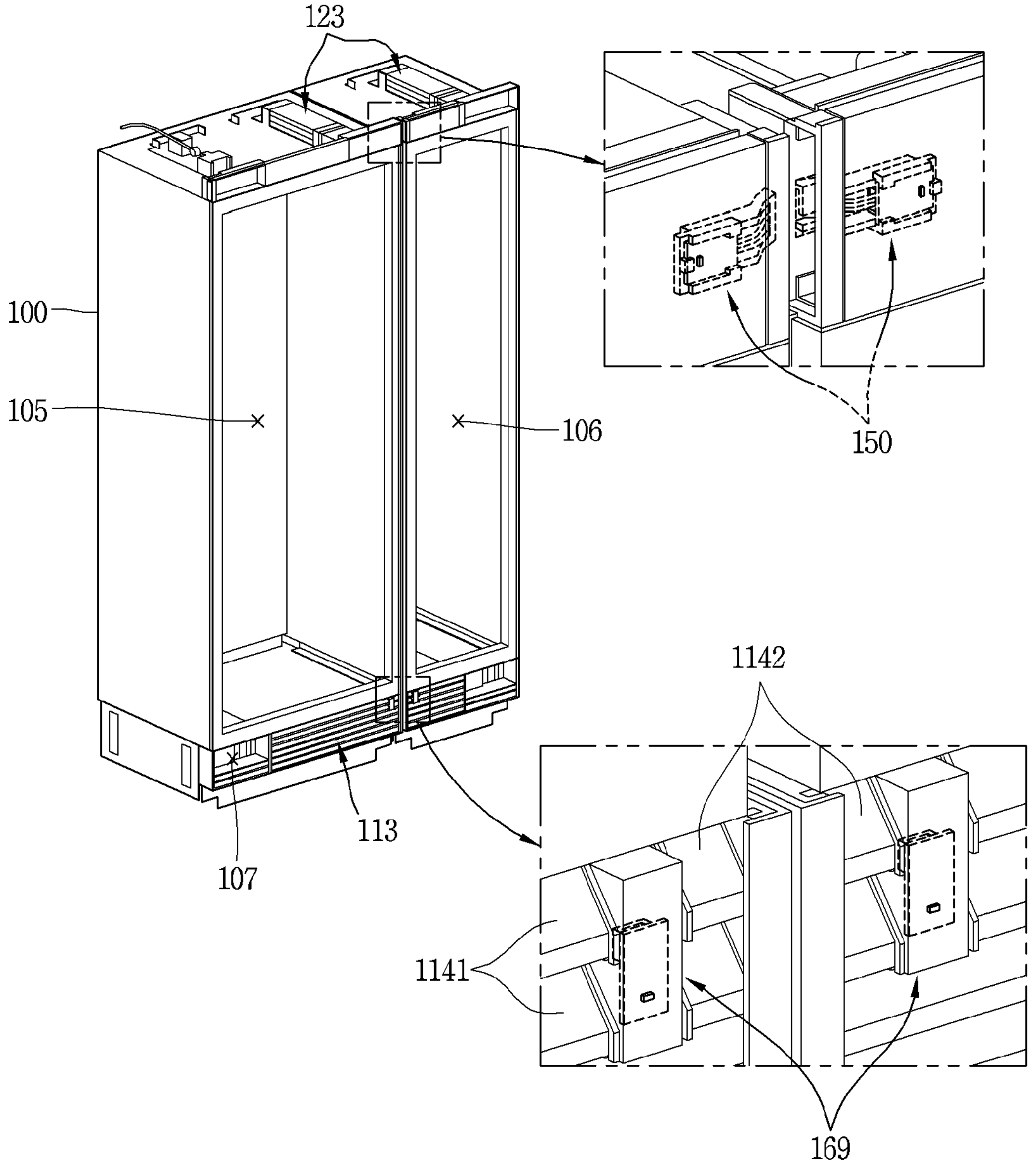

[Fig. 4]
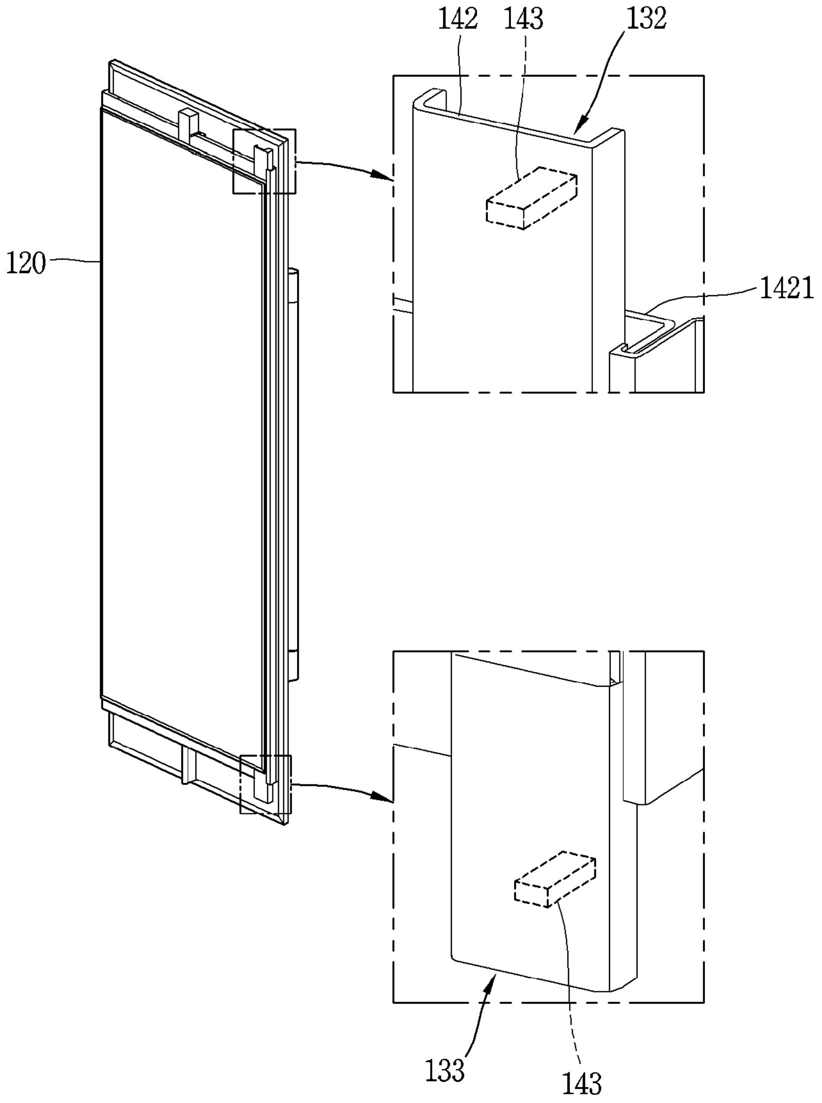

[Fig. 5]
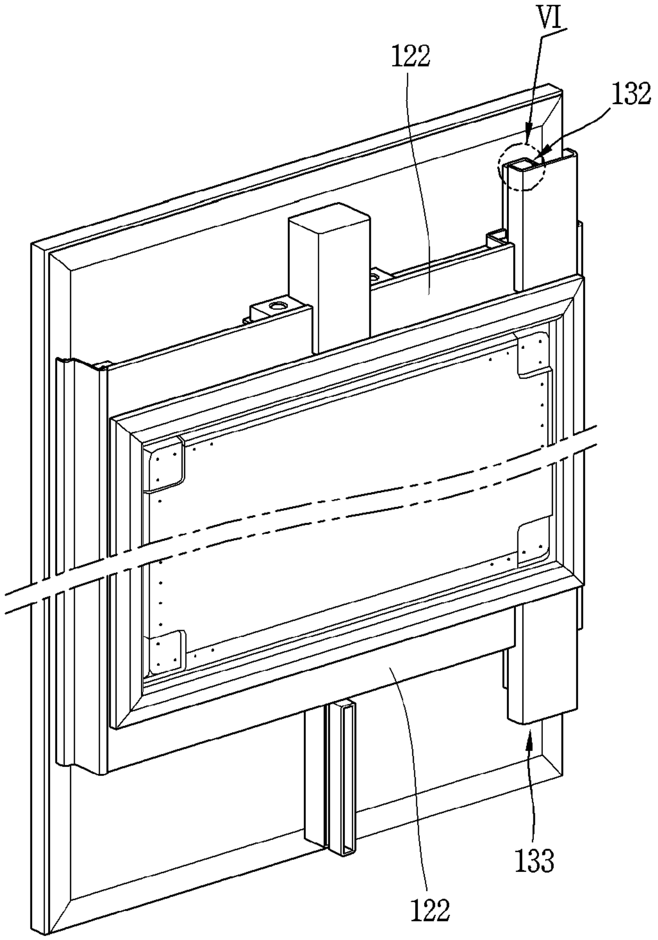

[Fig. 6]
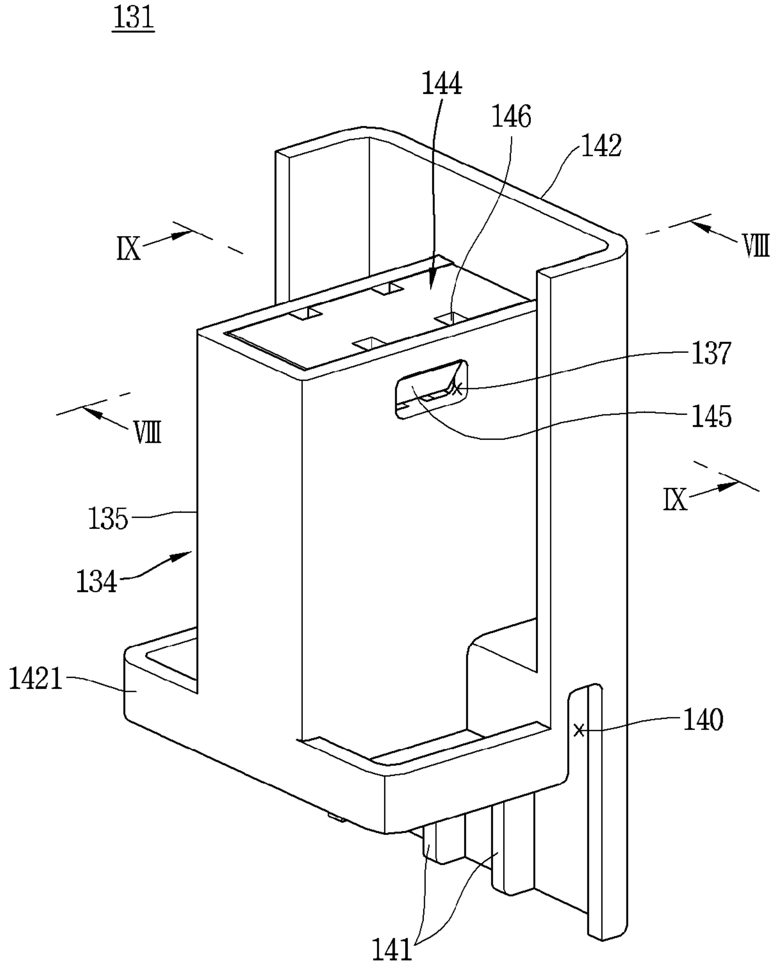

[Fig. 7]
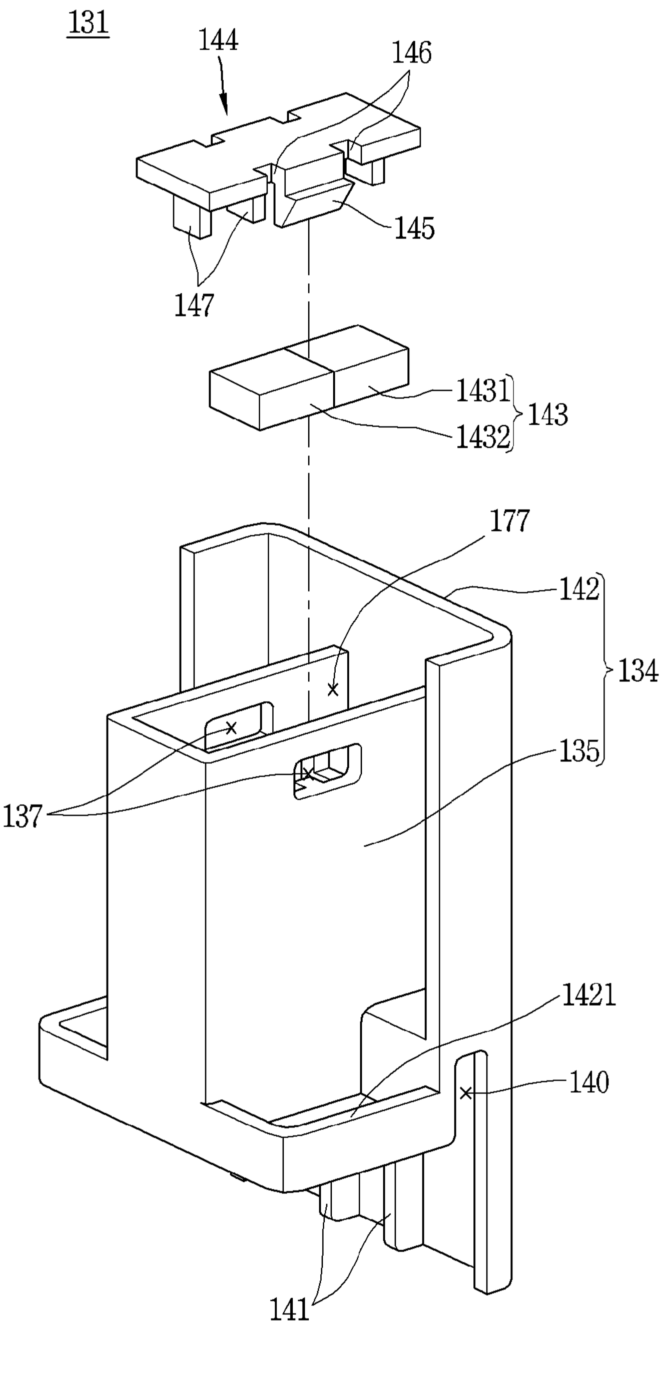

[Fig. 8]
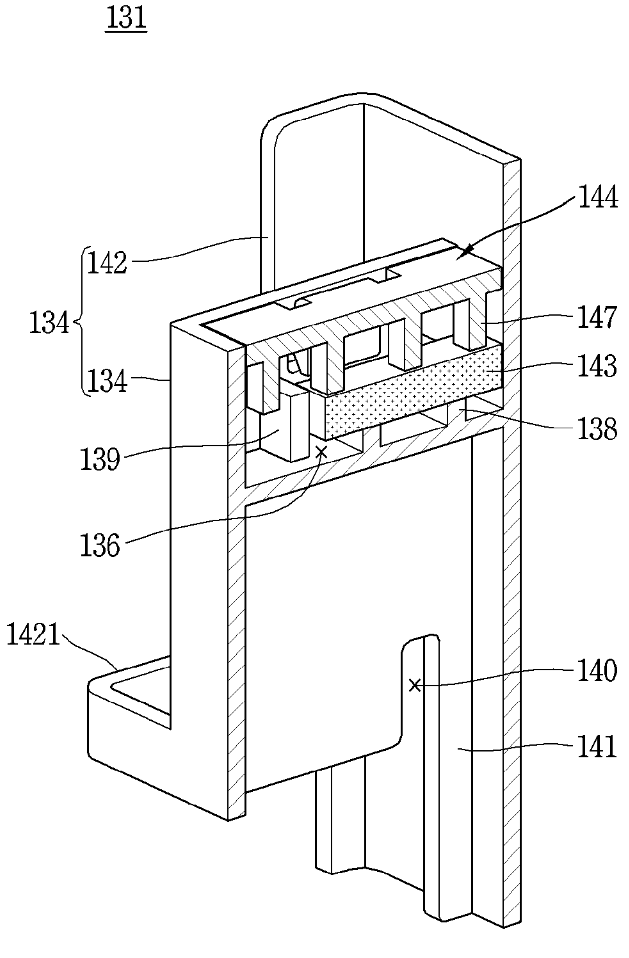

[Fig. 9]
131
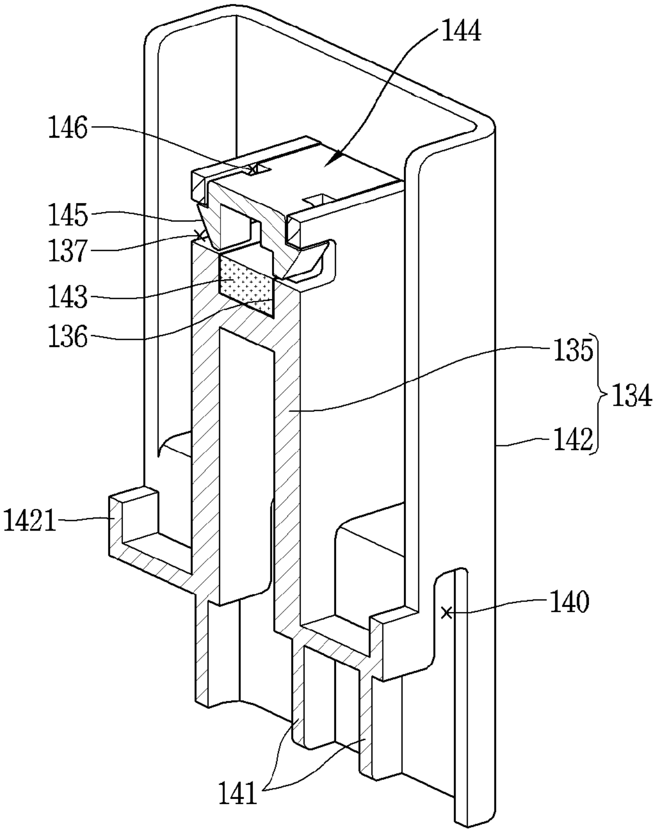

[Fig. 10]
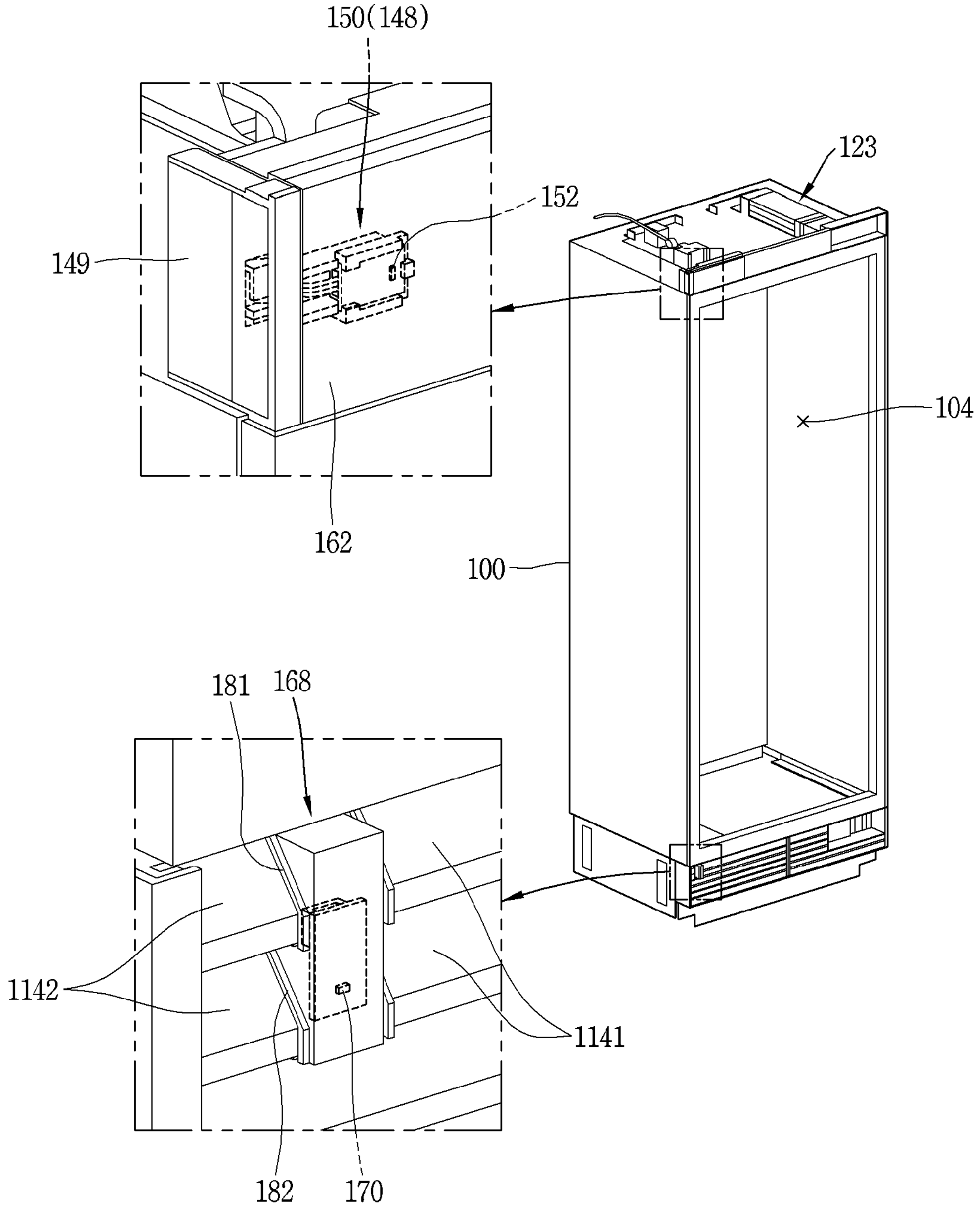

[Fig. 11]
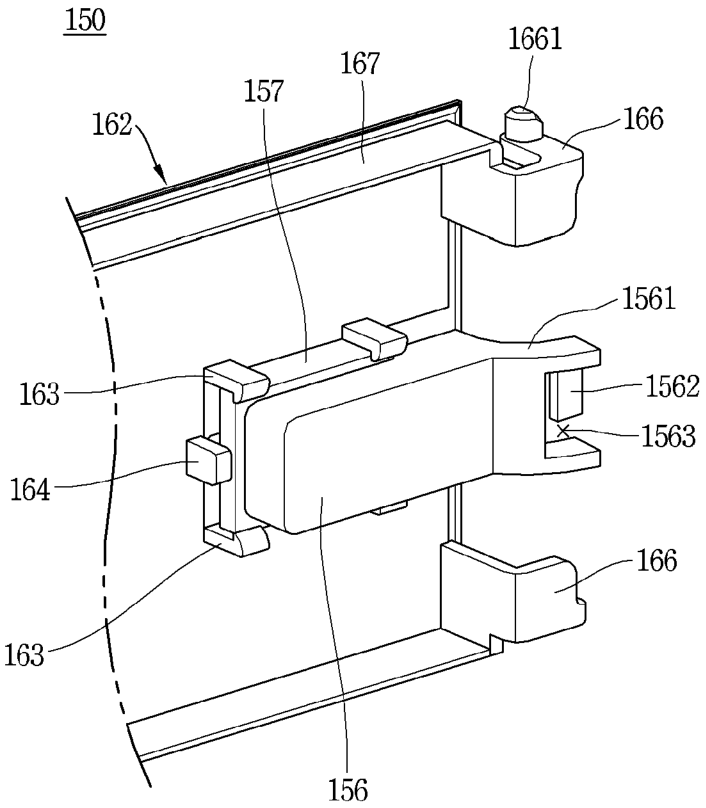
[Fig. 12]
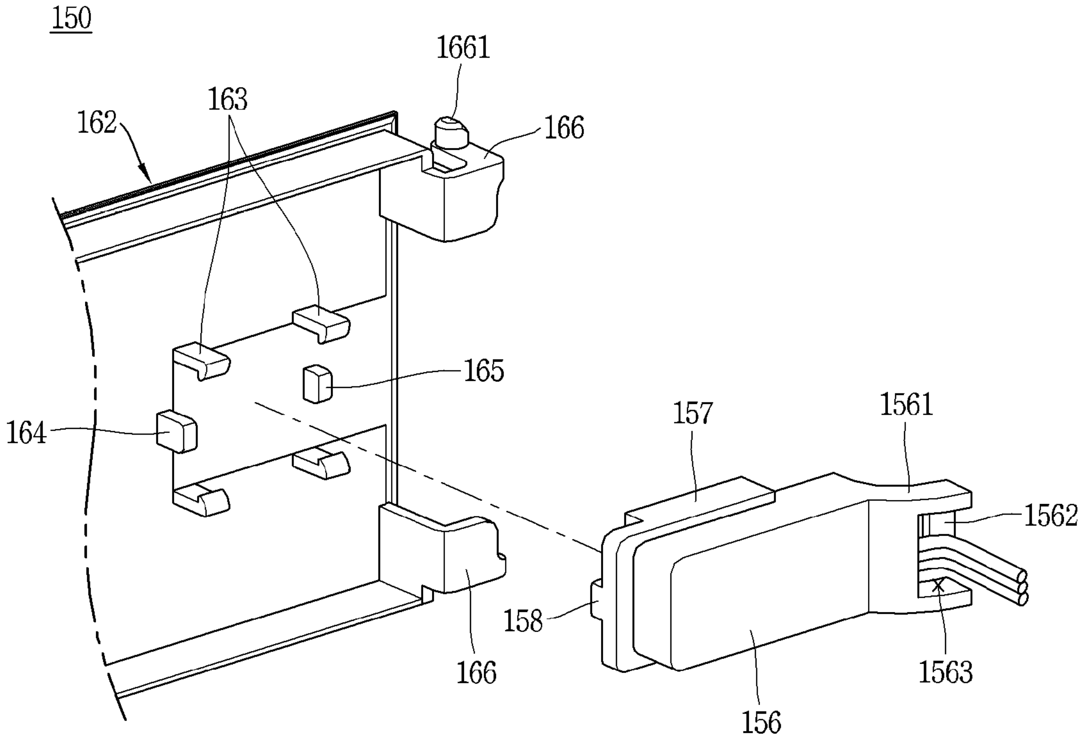

[Fig. 13]
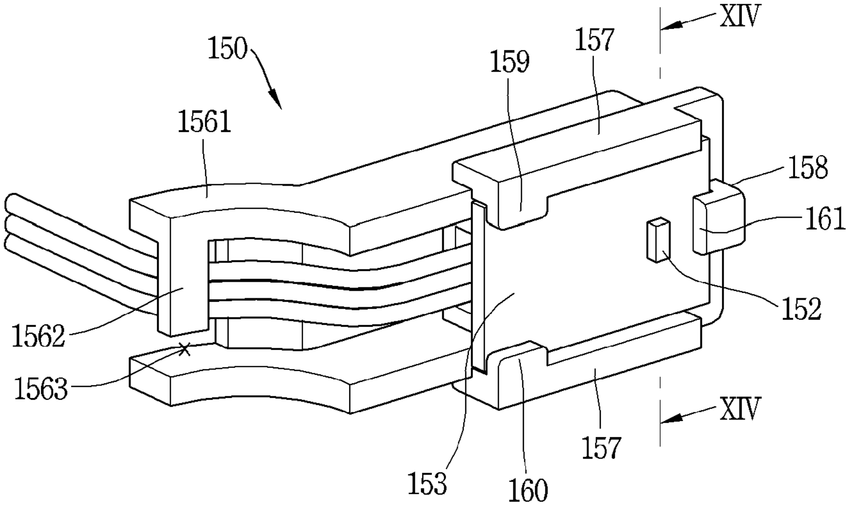
[Fig. 14]
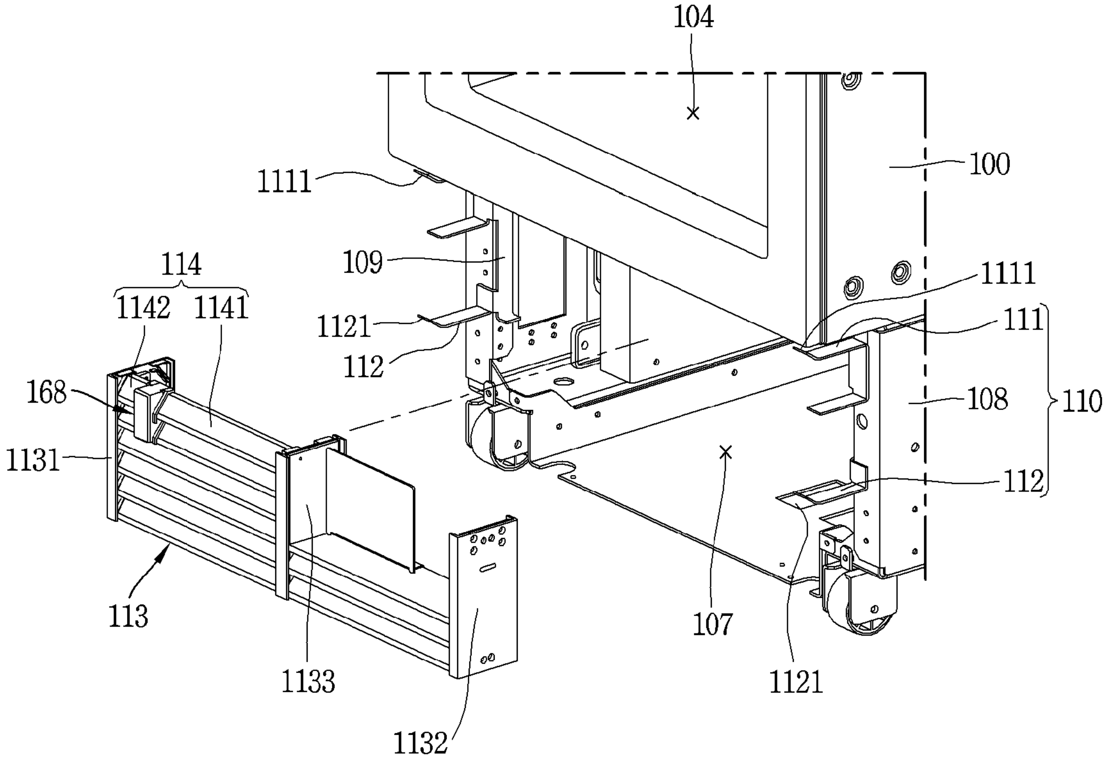

[Fig. 15]
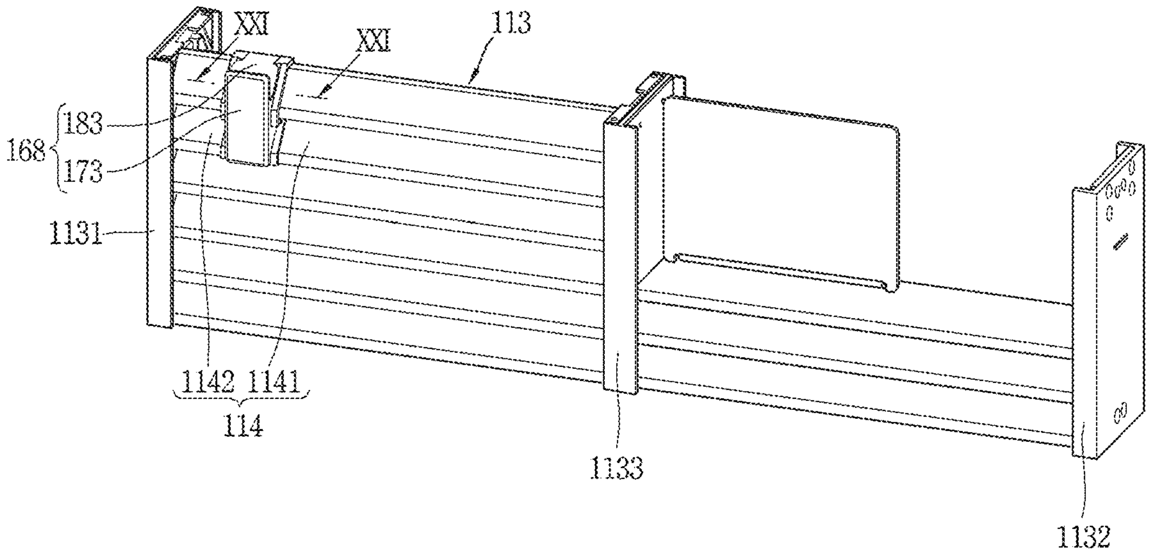
[Fig. 16]
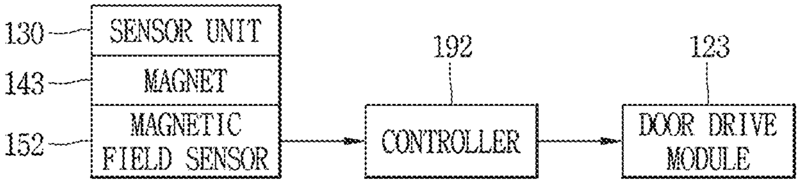

[Fig. 17]
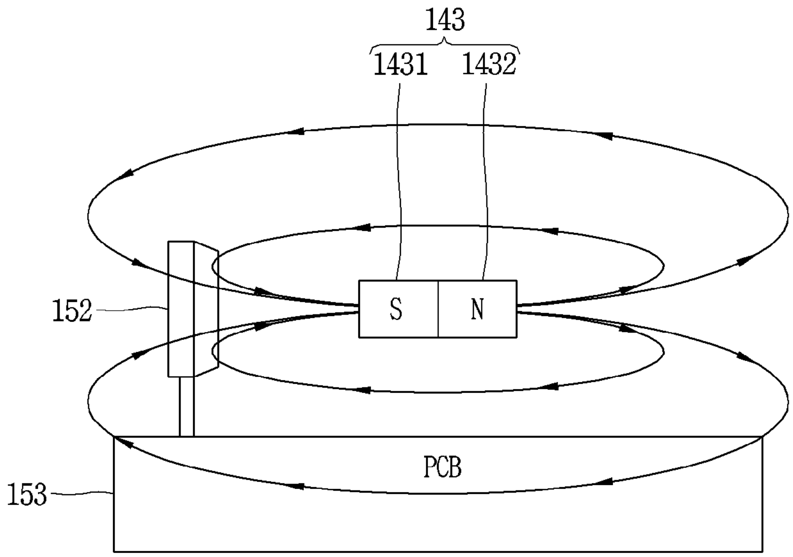
[Fig. 18]
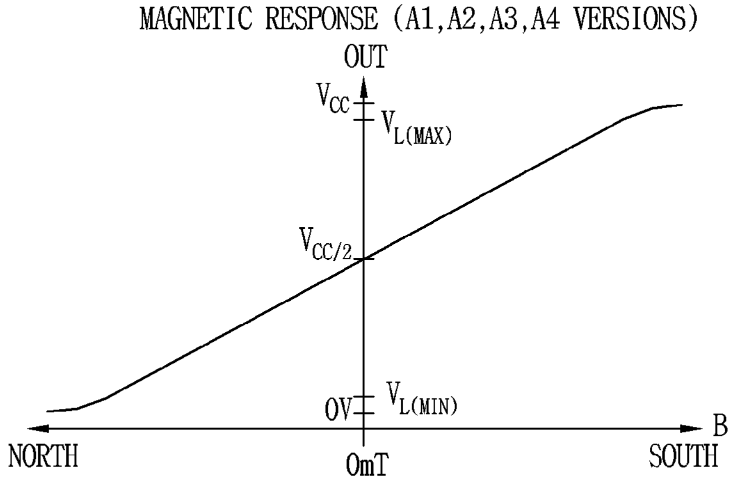

[Fig. 19]
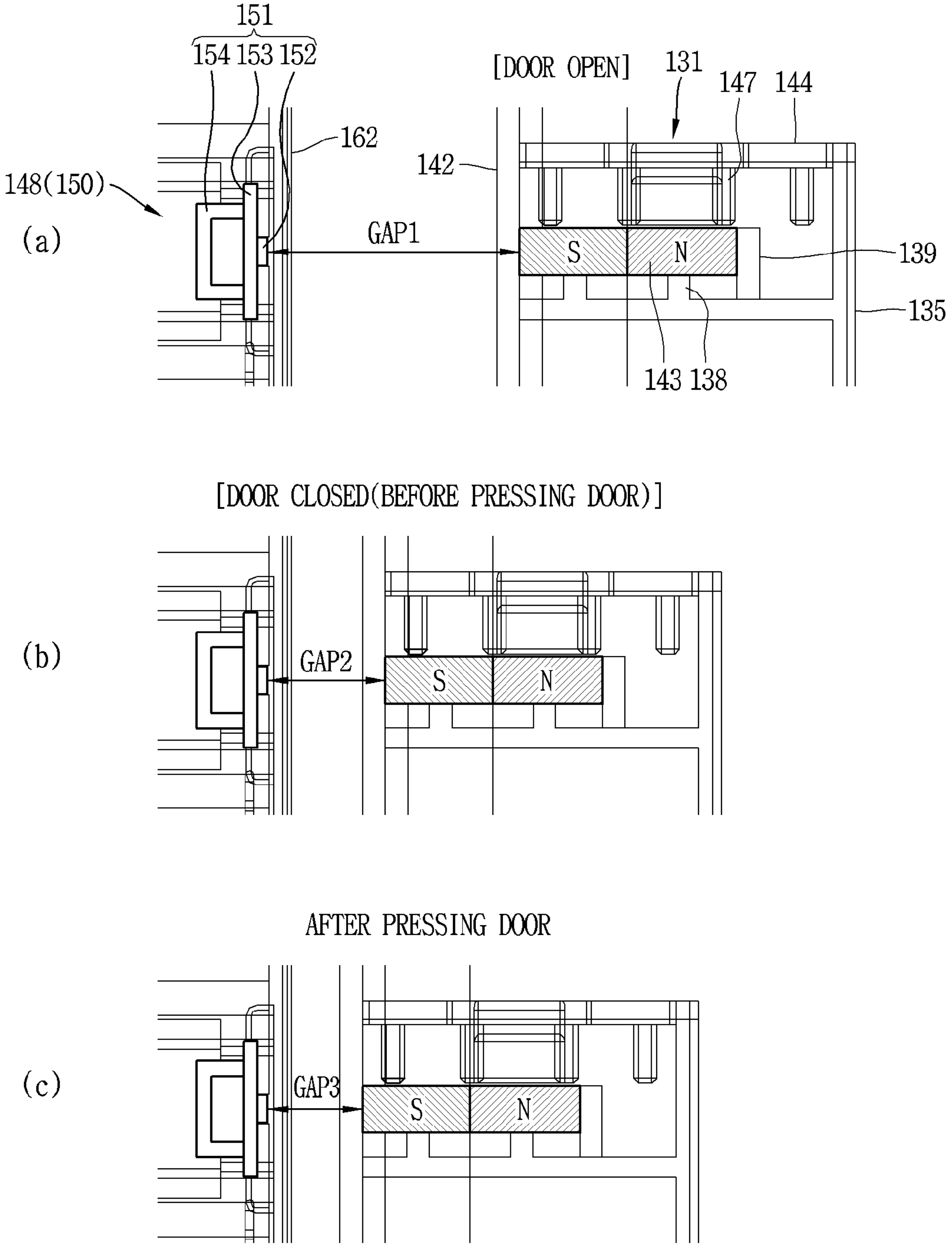

[Fig. 20]
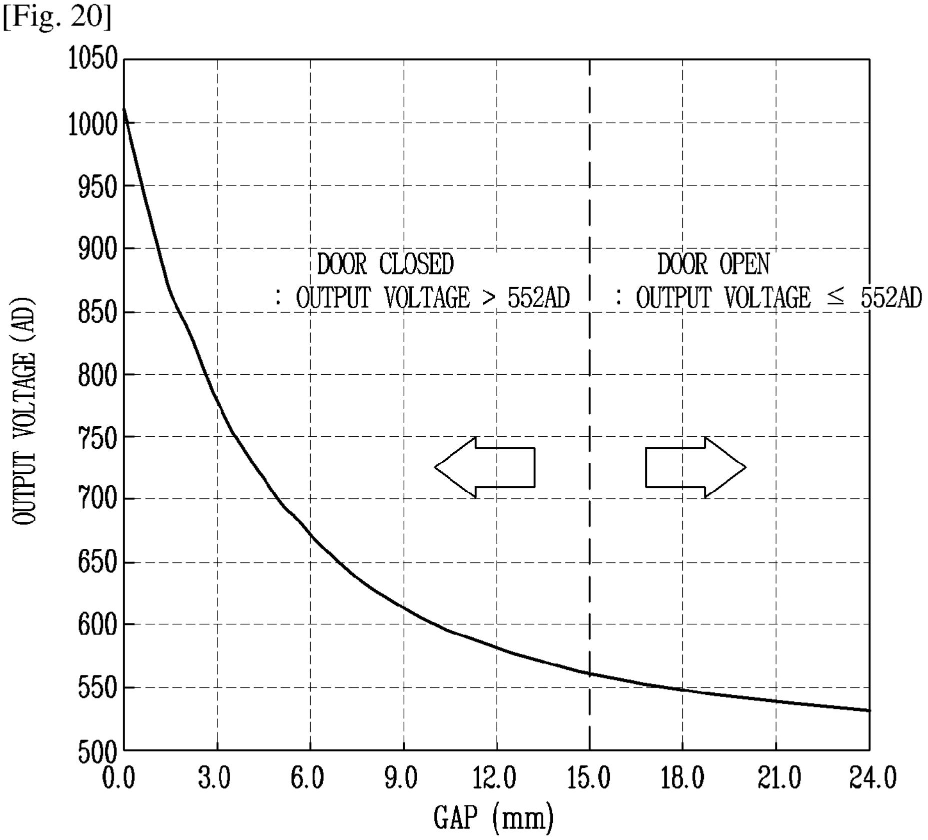

[Fig. 21]
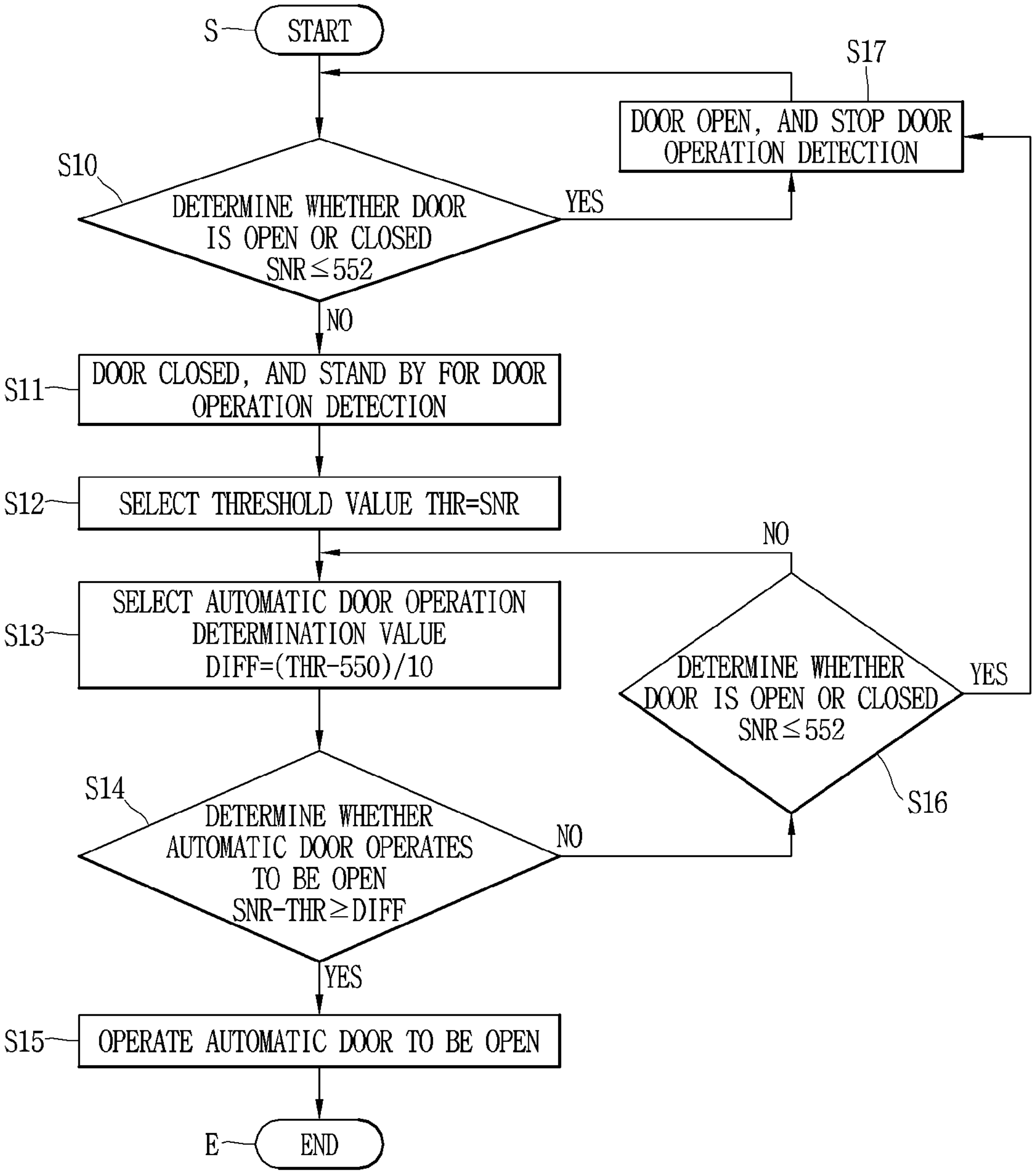

[Fig. 22]
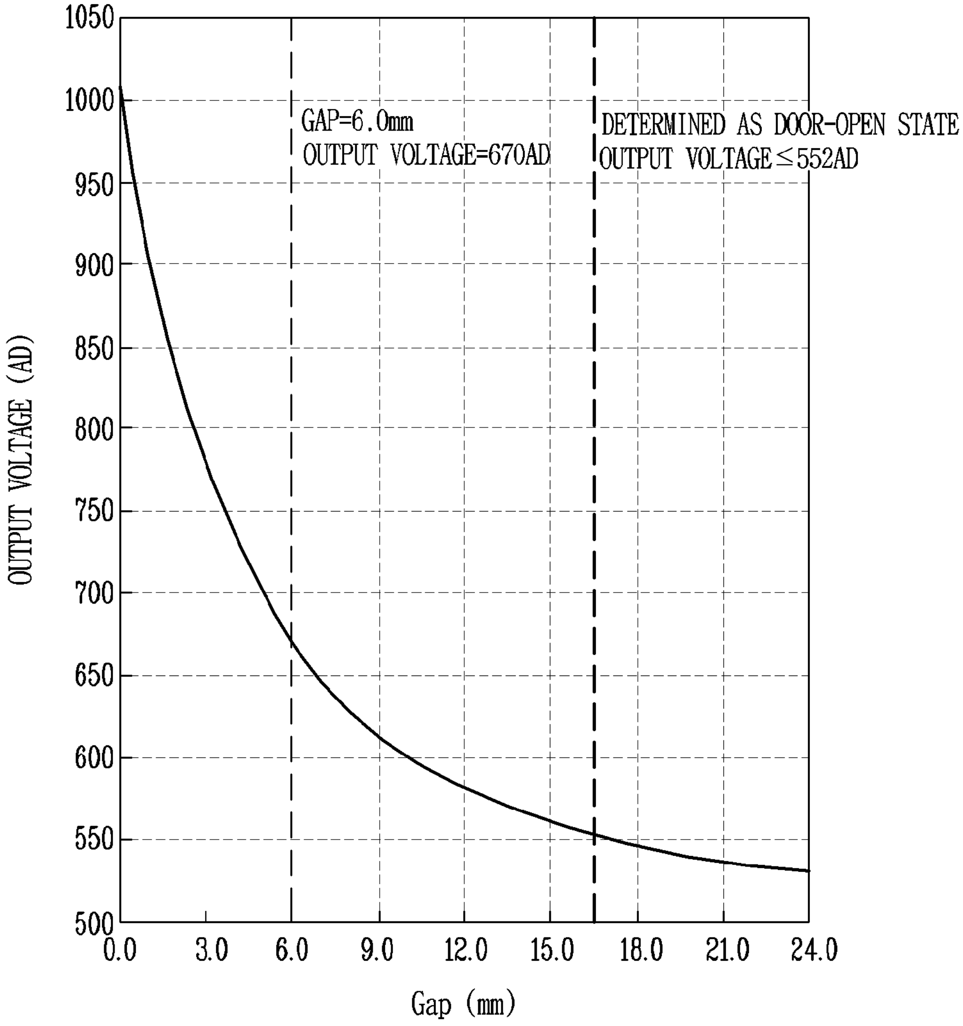

[Fig. 23]
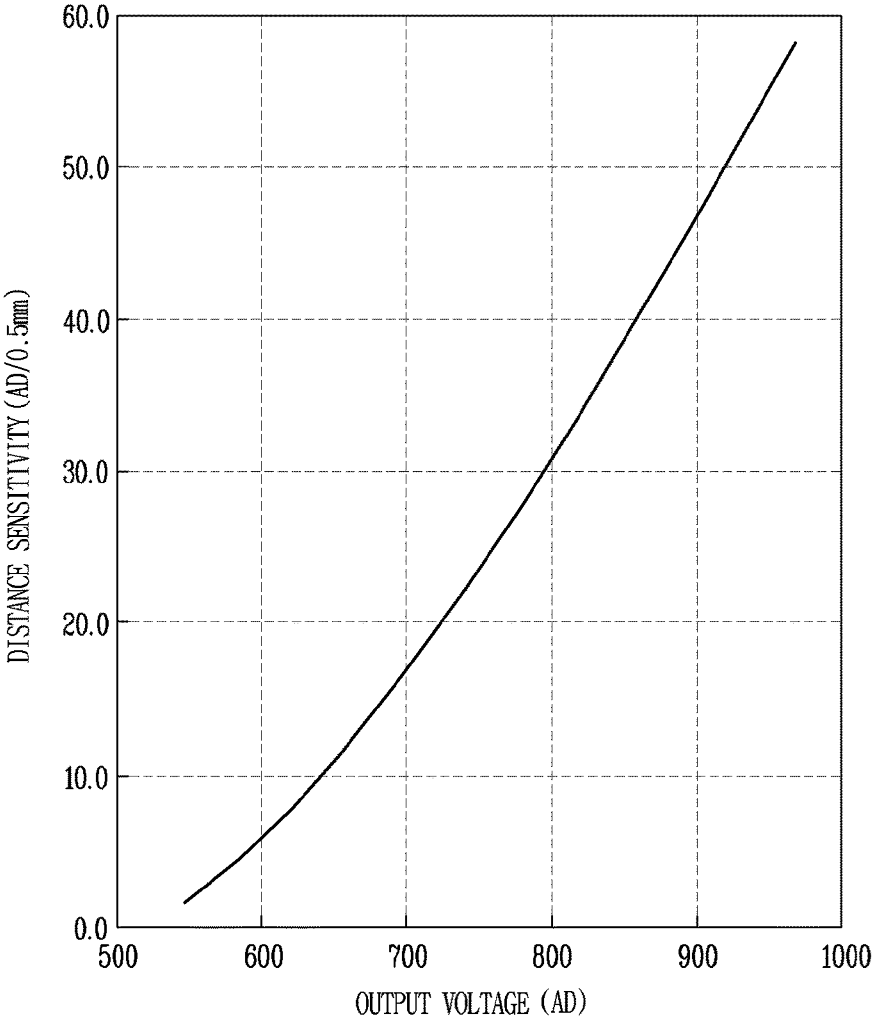
[Fig. 24]
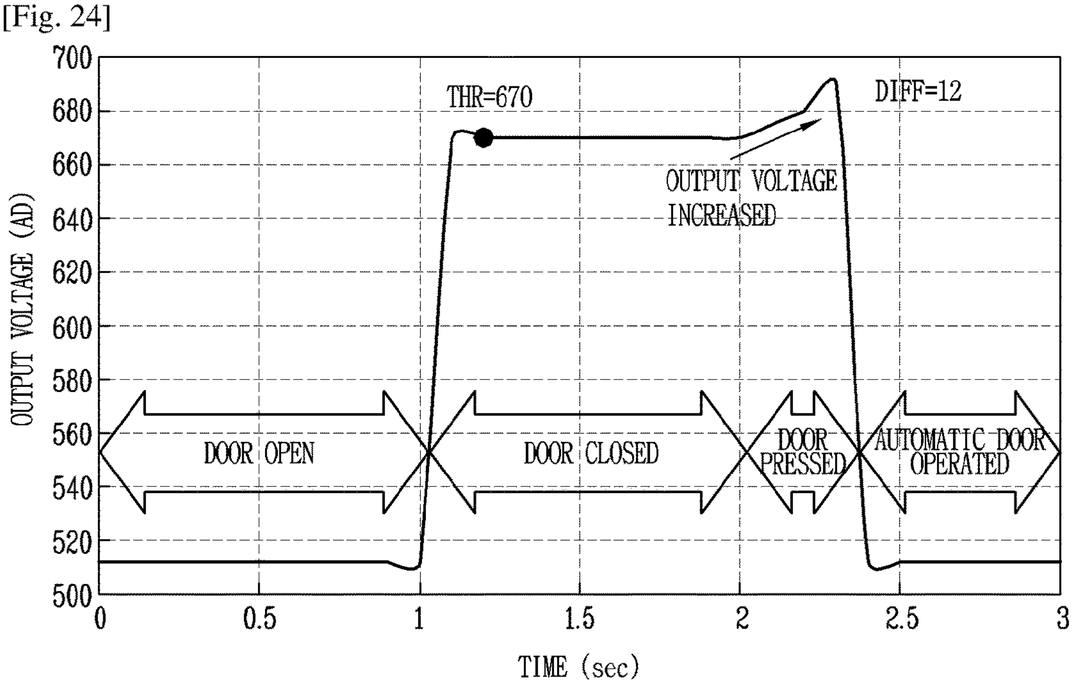

[Fig. 25]
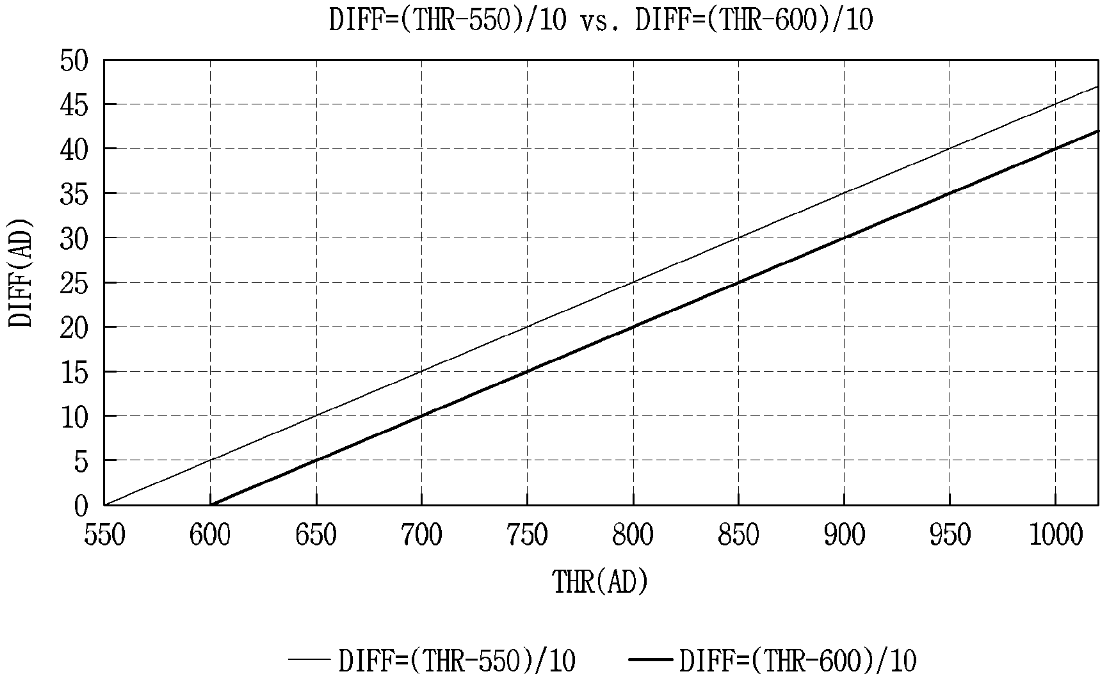
[Fig. 26]
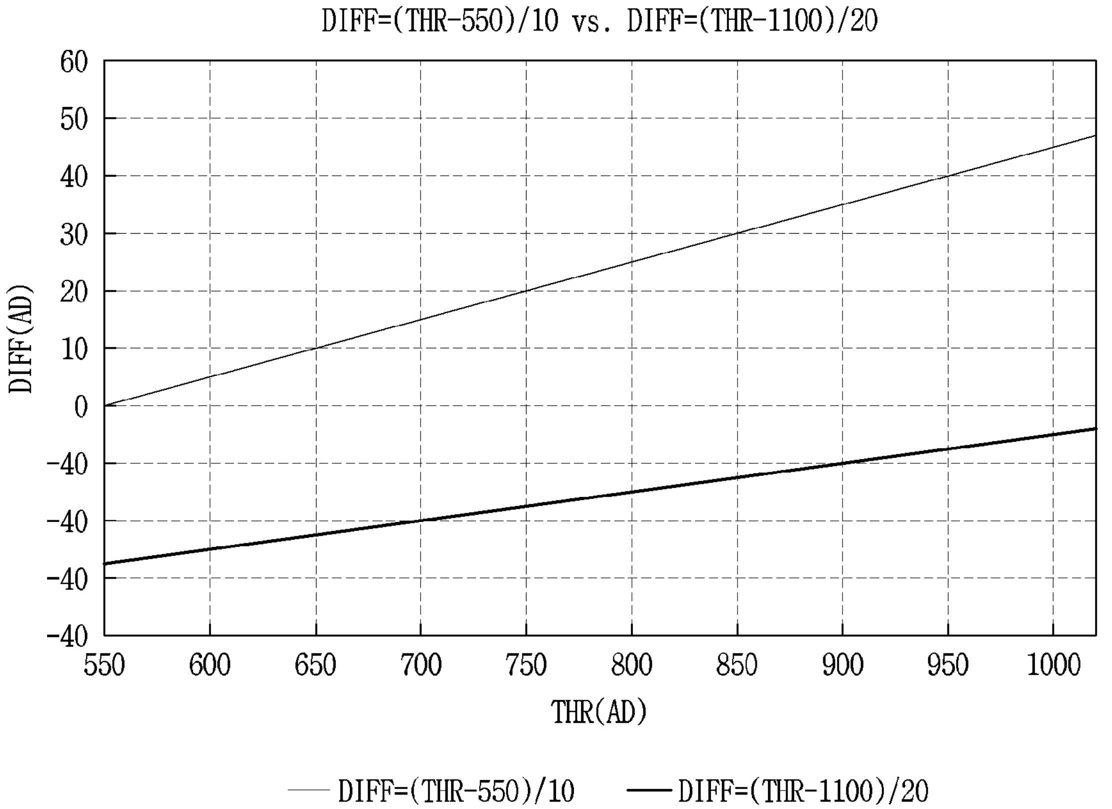

[Fig. 27]
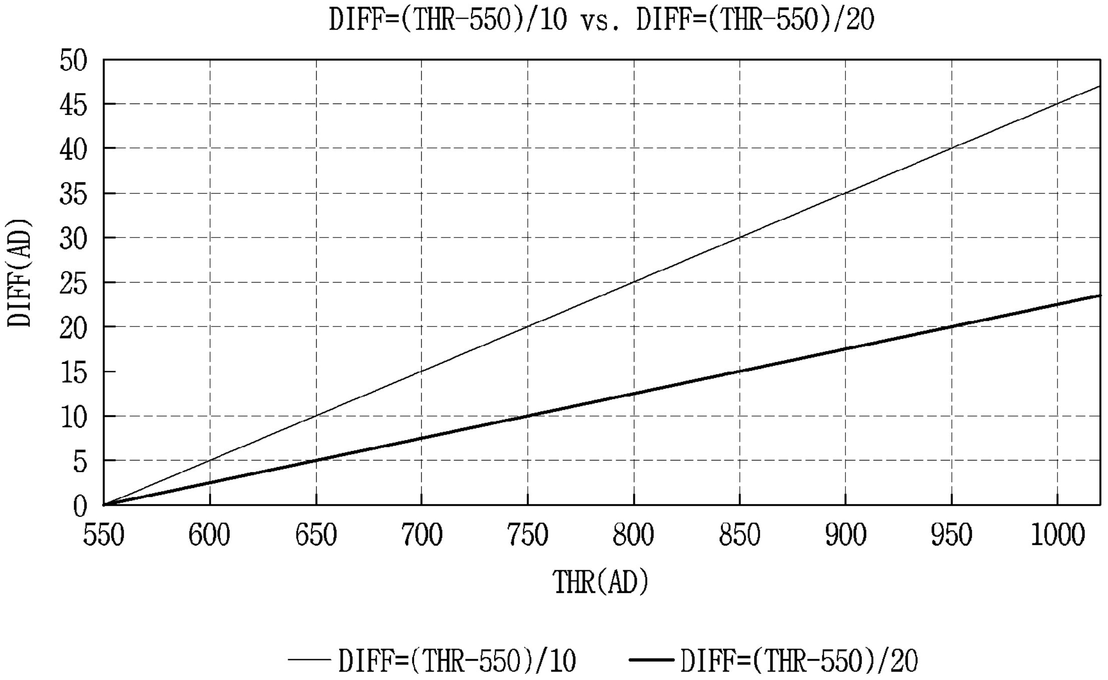

[Fig. 28]
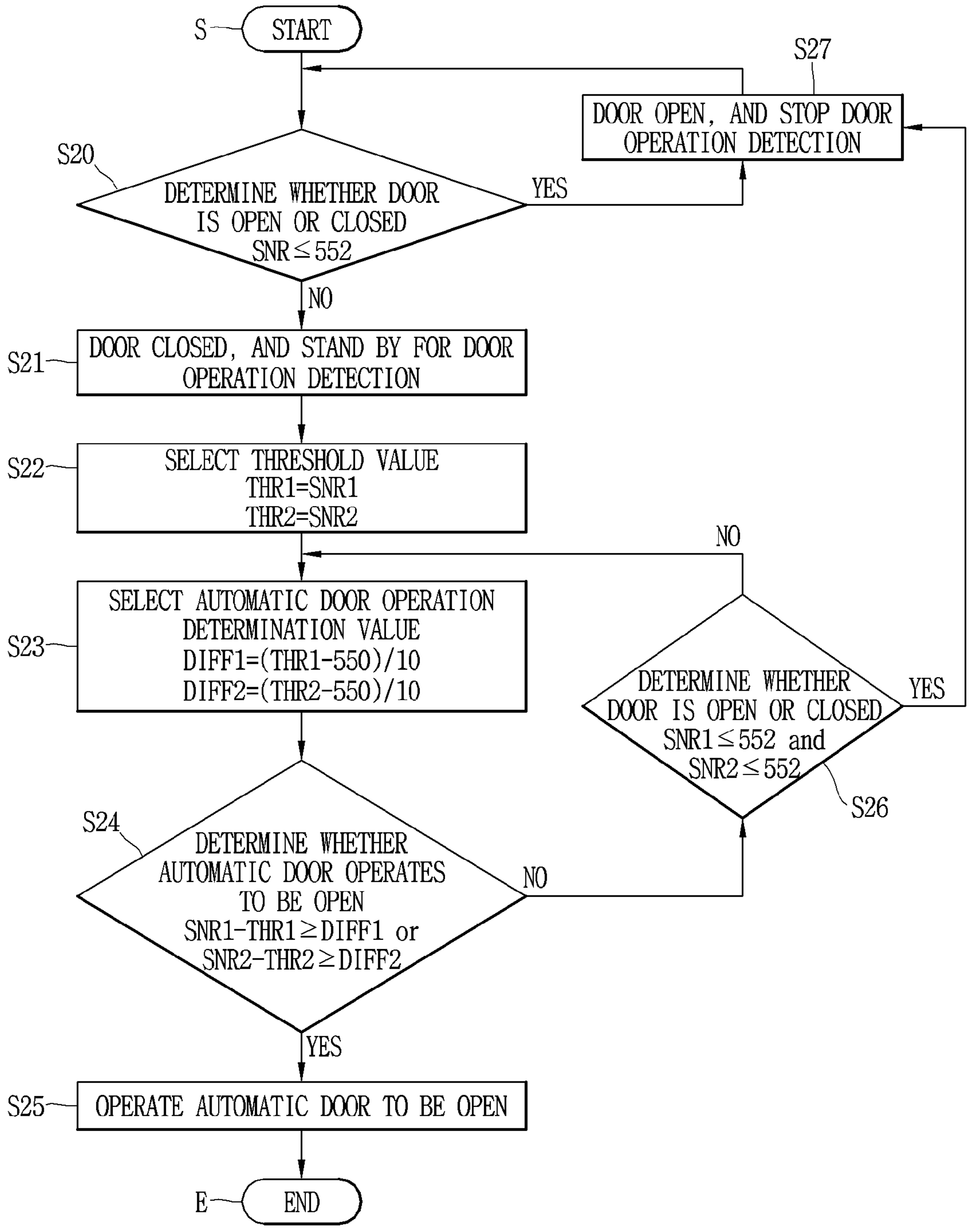

[Fig. 29]
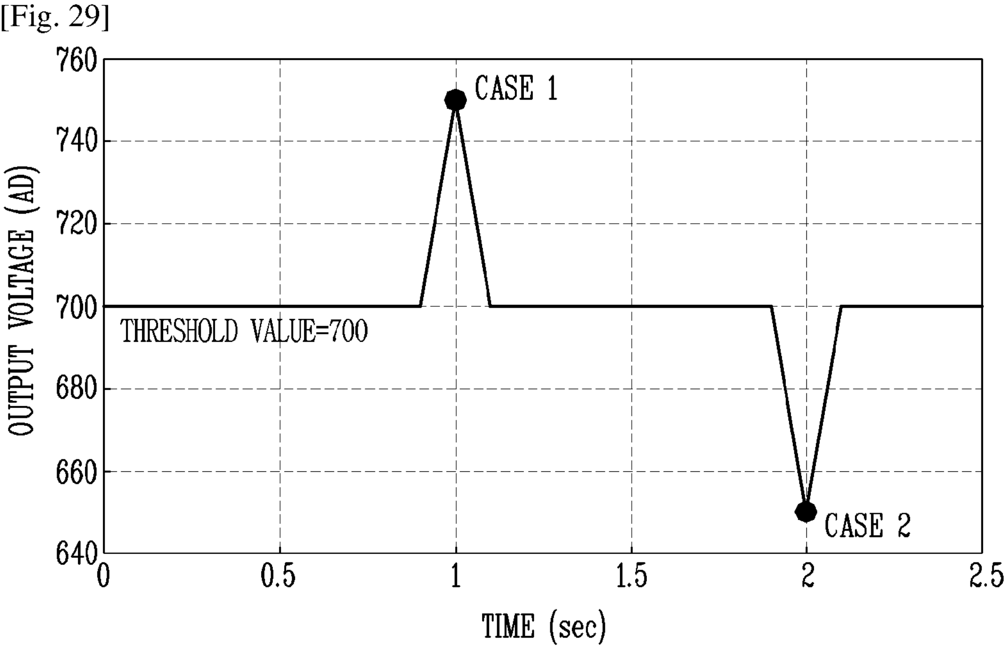

[Fig. 30]
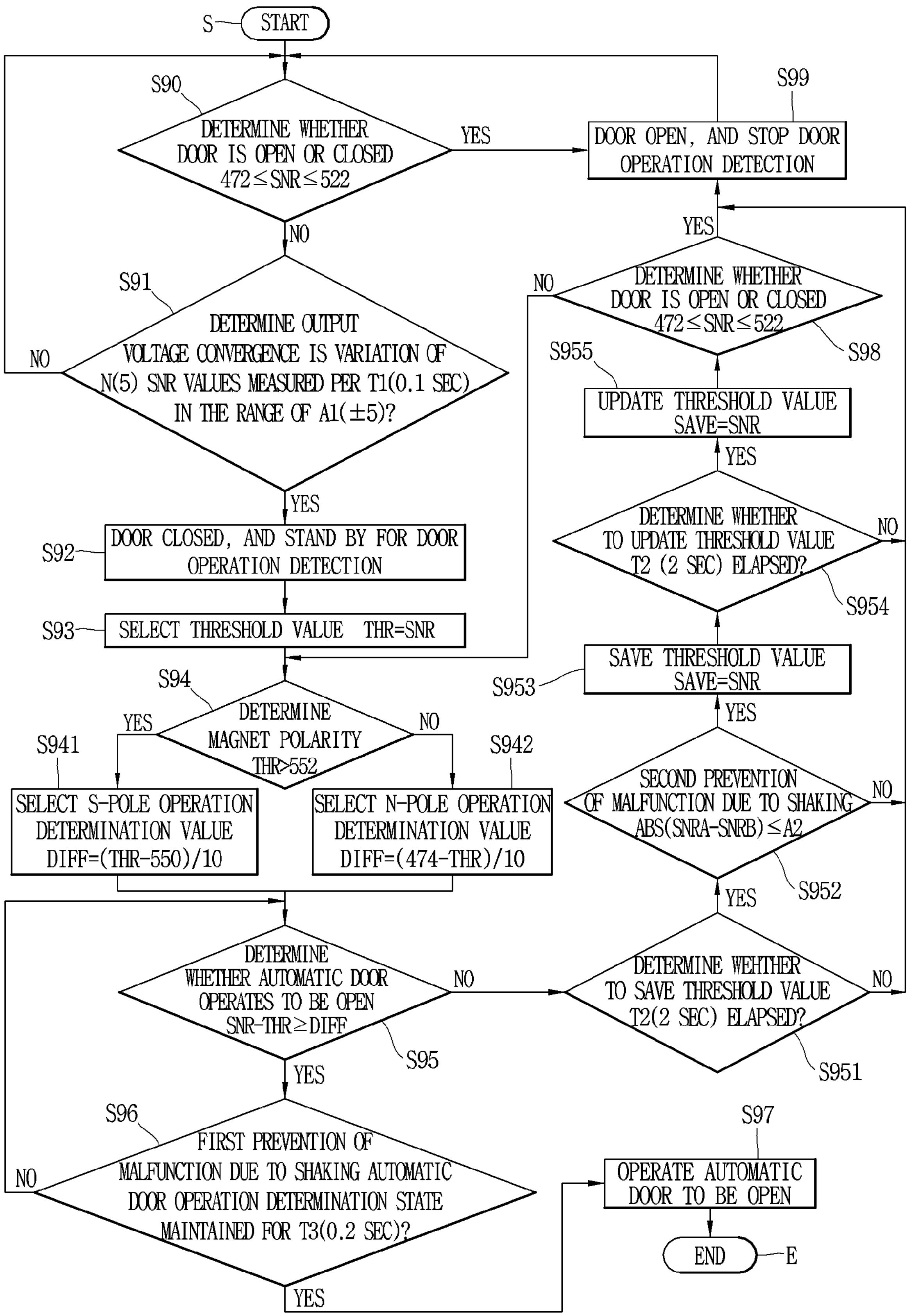

[Fig. 31a]
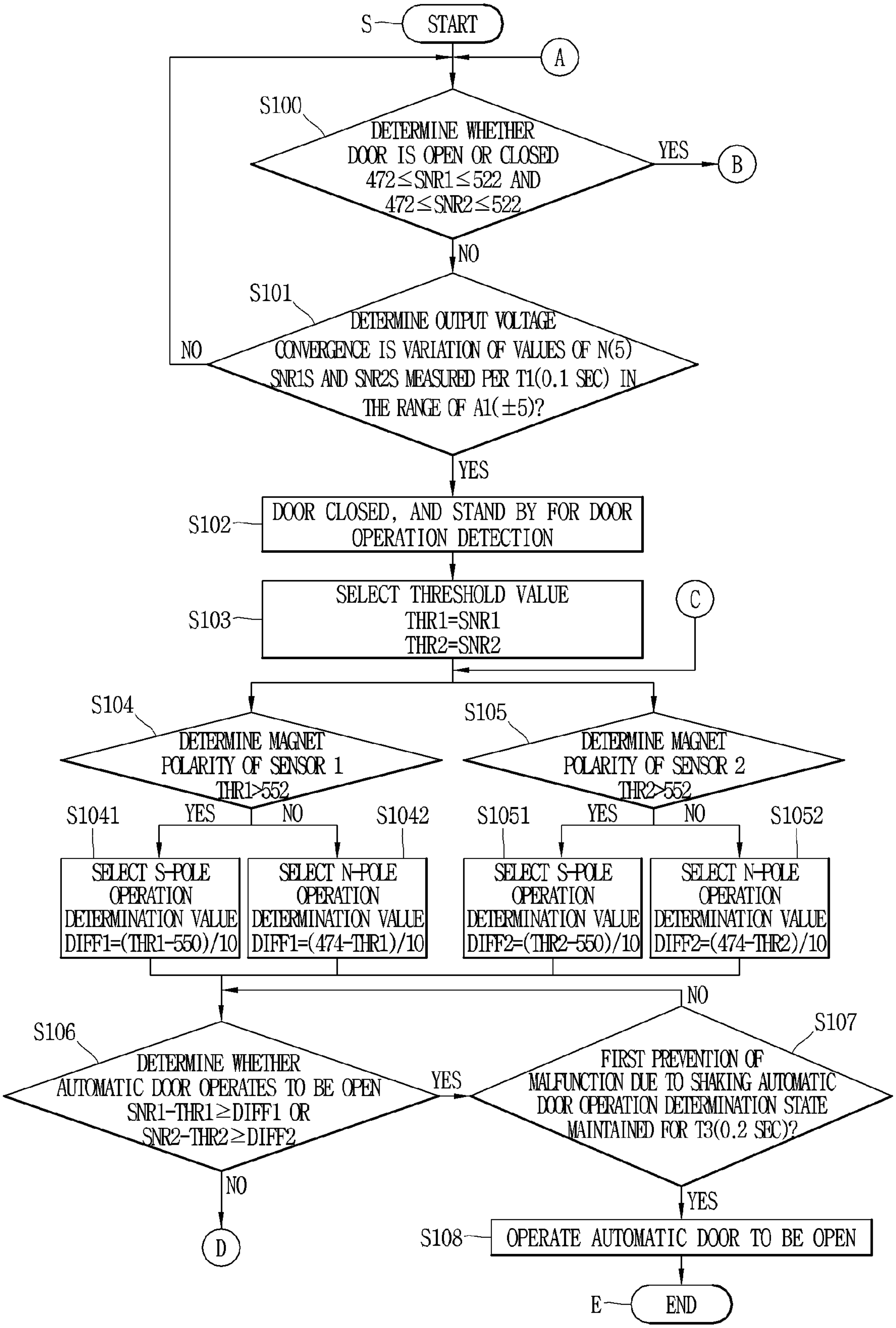

[Fig. 31b]
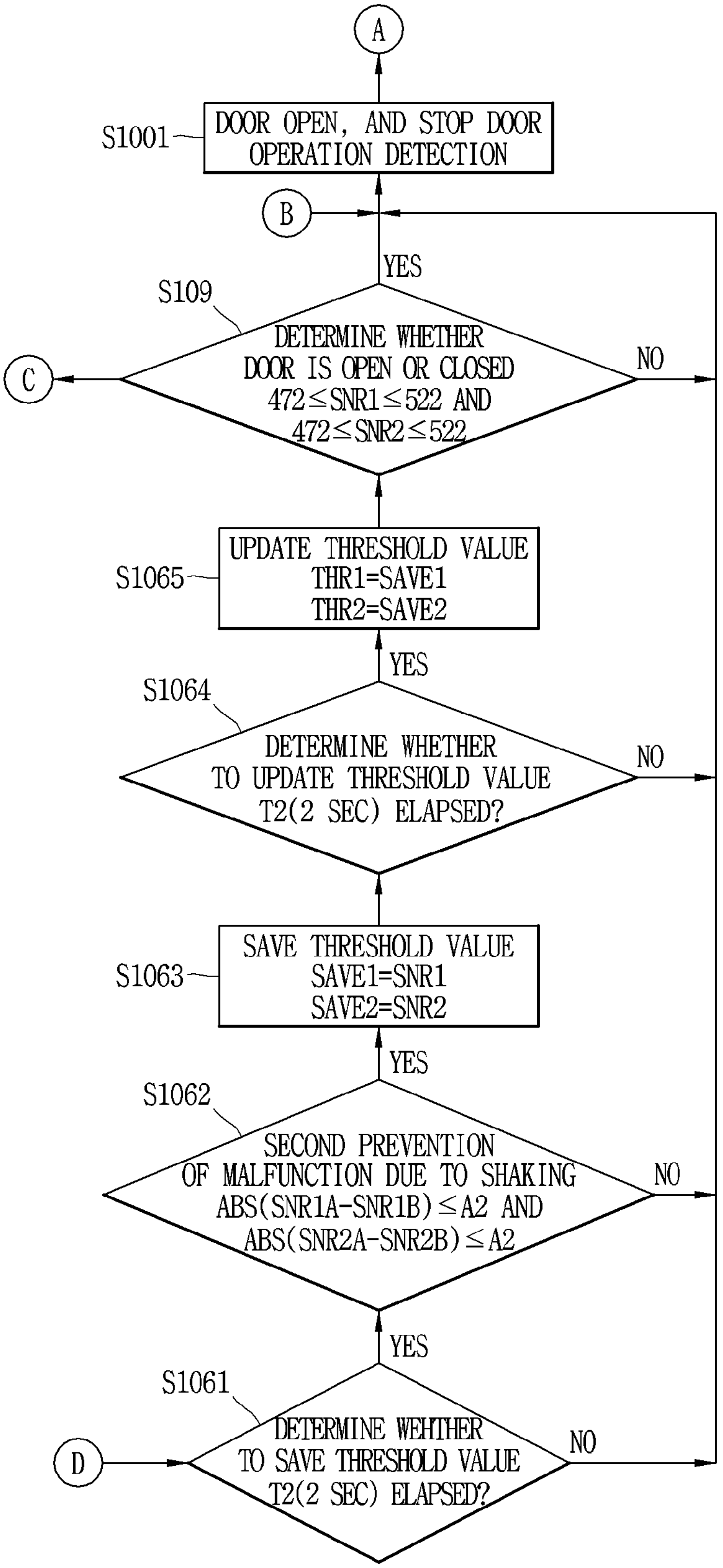

REFRIGERATOR WITH AUTOMATIC DOOR AND METHOD FOR CONTROLLING AUTOMATIC DOOR OF REFRIGERATOR

CROSS-REFERENCE TO RELATED APPLICATIONS

This application is a National Stage application under 35 U.S.C. § 371 of International Application No. PCT/KR2022/001898, filed on Feb. 8, 2022, which claims the benefit of Korean Application No. 10-2021-0018425, filed on Feb. 9, 2021. The disclosures of the prior applications are incorporated by reference in their entirety.

TECHNICAL FIELD

The present disclosure relates to a refrigerator having an automatic door that opens automatically upon pressing, and a method for controlling the automatic door of the refrigerator.

BACKGROUND

A refrigerator is a home appliance designed to maintain low temperatures inside a main body, providing a storage container for food items.

A conventional refrigerator includes a main body with a door attached, allowing users to open and close a storage container. This enables them to add or retrieve food items as needed.

As time passes, the external air that enters the storage container gradually cools down, reducing its specific volume. Consequently, the internal pressure of the storage container becomes lower than the external pressure.

Due to this pressure disparity between inside and outside of the storage container, a considerable amount of force is necessary to overcome it when opening the door.

In order to facilitate effortless door opening, a conventional refrigerator equipped automatic a door functionality includes a drive motor that engages when a user applies pressure to the door.

In some examples, a conventional refrigerator includes a detection sensor that determines the user's intention by detecting a movement direction of a detection lever that is disposed at a front end portion of a main body to come in contact with the door, and distinguishing a push input and an external impact applied to the door according to the movement direction of the detection lever.

However, for the conventional refrigerator, to ensure continuous contact between the detection lever and the door, it is necessary for the detection lever to extend outward from the front end of the main body toward the door. However, this factor can adversely affect the overall design of the refrigerator.

In addition, with the repetitive opening and closing of the door, the constant contact between the door and the detection lever leads to issues such as deformation, deterioration, and wear of a contact portion between the door and the detection lever.

In addition, in the conventional refrigerator with the automatic door, malfunctions of the automatic door can arise from various causes, including but not limited to door recoil upon closure, incorrect magnet assembly, fluctuations in internal refrigerator pressure, external impacts, and similar factors.

SUMMARY

The present disclosure is directed to a refrigerator with an automatic door having a structure capable of solving those problems and other drawbacks, and a method for controlling the automatic door of the refrigerator.

The present disclosure is also directed to a refrigerator with a structure for mounting a magnet and a magnetic field sensor to a door and a main body, which is capable of protecting the magnet and the magnetic field sensor from external impacts and stably supporting the magnet and the magnetic field sensor in spite of a repeated opening and closing operation of the door, and a method for controlling the automatic door of the refrigerator.

The present disclosure is further directed to a refrigerator with an automatic door that is capable of detecting a pressed amount (degree or level) of the door even without a direct contact with the door, and a method for controlling the automatic door of the refrigerator.

The present disclosure is further directed to a refrigerator with an automatic door that is capable of making appearance of the refrigerator beautiful by virtue of absence of a contact-type detection sensor and preventing an occurrence of deformation, deterioration, wear, etc. of a contact portion due to a contact with the door, and a method for controlling the automatic door of the refrigerator.

The present disclosure is further directed to a refrigerator with an automatic door that is capable of more stably determining whether the automatic door is operating, and a method for controlling the automatic door of the refrigerator.

The present disclosure is further directed to a refrigerator with an automatic door that is capable of solving malfunction of the automatic door even when a main body and the door shake due to recoil of the door when it is closed, and a method for controlling the automatic door of the refrigerator.

The present disclosure is further directed to a refrigerator with an automatic door that is capable of solving malfunction of the automatic door even when a magnet is incorrectly assembled with polarities reversed, and a method for controlling the automatic door of the refrigerator.

The present disclosure is further directed to a refrigerator with an automatic door that is capable of solving malfunction of the automatic door even when internal pressure of the refrigerator changes, and a method for controlling the automatic door of the refrigerator.

The present disclosure is further directed to a refrigerator with an automatic door that is capable of solving malfunction of the automatic door even when a main body and the door shake due to external causes, and a method for controlling the automatic door of the refrigerator.

The present disclosure is further directed to a refrigerator with an automatic door that is capable of preventing the automatic door from being unintentionally open, which may occur when an excessively small operation determination value is selected, and a method for controlling the automatic door of the refrigerator.

According to one aspect of the subject matter described in this application, a refrigerator can include a main body including an inner case defining a storage container, an outer case surrounding the inner case, and an insulator disposed between the inner case and the outer case, a door rotatably coupled to the main body and configured to open and close the storage container, a door driver disposed at an upper portion of the main body and configured to, based on the door being pressed, open the door, a sensor comprising a magnetic field sensor and a magnet and configured to detect an open or closed state of the door and measure a pressed amount of the door based on to a change in a distance between the magnetic field sensor and the magnet, and a controller configured to control the door driver and determine whether the door operates is to be opened based on to the pressed amount of the door. The controller can be configured to select, as a threshold value, an output voltage of the magnetic field sensor based on the door being closed, select an operation determination value of the door according to the threshold value, control the door driver to open the door open based on a state being maintained for a first preset time, and determine, based on the state not being maintained for the first preset time, whether the door is to be opened, where a difference between the output voltage of the magnetic field sensor and the threshold value is equal to or greater than the operation determination value in the state.

Implementations according to this aspect can include one or more of the following features. For example, the controller can be configured to determine whether the door is to be opened by comparing (i) a difference between an output voltage of the magnetic field sensor when the door is pressed and the threshold value with (ii) the operation determination value, based on the difference between the output voltage of the magnetic field sensor when the door is pressed and the threshold value being equal to or greater than the operation determination value, control the door driver to open the door, and, based on the difference between the output voltage of the magnetic field sensor when the door is pressed and the threshold value being less than the operation determination value, determine whether the door is opened or closed.

In some implementations, the controller can be configured to compare the output voltage of the magnetic field sensor with a preset voltage value to determine whether the door is opened or closed, based on the output voltage being equal to or greater than the preset voltage value, determine that the door is closed, and, based on the output voltage being less than the preset voltage value, determine that the door is opened. In some implementations, the controller can be configured to, based on a determination that the door is closed, compare a variation of an output voltage measured every preset time with a preset convergence determination voltage value, based on the variation of the output voltage being equal to or less than the convergence determination voltage value, determine that the output voltage converges, and select the converged output voltage as the threshold value.

In some examples, the controller can be configured to, based on a determination that the difference between the output voltage of the magnetic field sensor and the threshold value is less than the operation determination value, determine whether to save the threshold value, compare, based on a second preset time being elapsed from a time point at which it is determined whether to save the threshold value, a preset voltage value with a difference between a first output voltage and a second output voltage, the first output voltage being output when a third preset time less than the second preset time elapses from the time point at which it is determined whether to save the threshold value, and the second output voltage being output when the second preset time elapses from the time point at which it is determined whether to save the threshold value, based on the difference being equal to or less than the preset voltage value, save the threshold value, and, based on a fourth preset time being elapsed after saving the threshold value, update the threshold value. In some examples, the magnetic field sensor can be disposed at the main body and the magnet is disposed at the door, and the magnetic field sensor can be an analog Hall sensor.

In some implementations, the magnet can have a first pole and a second pole, and the magnet can face the magnetic field sensor, the first pole facing the magnetic field sensor and the second pole facing an opposite direction relative to the magnetic field sensor. In some implementations, the magnetic field sensor can be provided in plurality, the plurality of magnetic field sensor being disposed at an upper portion and a lower portion of the main body, respectively, and the magnet can be provided in plurality, the plurality of magnets being disposed at an upper portion and a lower portion of the door, respectively.

In some examples, the storage container can include a refrigerating chamber defined at a first side in the main body, and a freezing chamber defined at a second side in the main body. The door can include a refrigerating chamber door coupled to the first side of the main body and configured to open and close the refrigerating chamber, and a freezing chamber door coupled to the second side of the main body and configured to open and close the freezing chamber. The magnetic field sensor can be provided as a single sensor or in plurality on each of the first side and the second side of the main body, and the magnet can be provided as a single magnet or in plurality on each of the refrigerating chamber door and the freezing chamber door to face the magnetic field sensor. In some examples, the magnetic field sensor can be disposed at the door, and the magnet can be disposed at the main body.

According to another aspect of the subject matter described in this application, a method for controlling an automatic door of a refrigerator that comprises a main body having a storage container therein, and a door rotatably coupled to the main body to open and close the storage container, and a door driver configured to, based on the door being pressed, automatically open the door, can include periodically measuring an output voltage of a magnetic field sensor every preset time, the magnetic field sensor configured to detect magnetic flux density according to a change in distance between the magnetic field sensor and a magnet, determining whether the door is opened or closed by comparing the output voltage with a preset voltage value, selecting an output voltage at a time at which it is determined that the door is closed, as a threshold value, selecting an operation determination value of the door according to the threshold value, determining whether the door is to be opened by comparing a difference between an output voltage measured when the door is pressed and the threshold value with the operation determination value, and controlling the door driver to open the door based on a state being maintained for a first preset time, while performing a determination on whether the door is to be opened based on the state not being maintained for the first preset time, where a difference between the output voltage of the magnetic field sensor and the threshold value is equal to or greater than the operation determination value in the state.

Implementations according to this aspect can include one or more of the following features. For example, determining whether the door is to be opened can include determining whether to save the threshold value based on the difference between the output voltage of the magnetic field sensor and the threshold value being less than the operation determination value, determining whether to save the threshold value can include comparing, based on a second preset time being elapsed from a time point at which it is determined whether to save the threshold value, a preset voltage value with a difference between a first output voltage and a second output voltage, the first output voltage being output when a third preset time less than the second preset time elapses from the time point at which it is determined whether to save the threshold value, and the second output voltage being output when the second preset time elapses from the time point at which it is determined whether to save the threshold value, saving the threshold value based on the difference being equal to or less than the preset voltage value, and updating the threshold value based on a fourth preset time being elapsed after saving the threshold value.

In some examples, the first preset time can be 0.2 seconds, the second preset time can be 2.0 seconds, the third preset time can be 1.9 seconds, and the fourth preset time can be 2 seconds. In some implementations, determining whether the door is opened or closed can be configured such that the door is determined to be closed based on the output voltage being greater than the preset voltage value, and determined to be opened based on the output voltage being less than or equal to the preset voltage value, and determining whether the door is opened or closed can include stopping the determination as to whether the door is to be opened when it is determined that the door is opened.

In some implementations, determining whether the door is opened or closed can further include determining whether the output voltage converges based on the output voltage being greater than the preset voltage value, and determining whether the output voltage converges can include measuring an output voltage every preset time, sampling the output voltages each measured every preset time into steps each including a plurality of output voltages, determining that the output voltage converges based on a variation of the sampled output voltages being equal to or less than a preset convergence determination voltage value, determining that the output voltage does not converge based on the variation of the sampled output voltages being greater than the convergence determination voltage value, determining that the door is closed based on the output voltage being converged, and determining whether the door is open or closed when the output voltage does not converge, and selecting the threshold value can include selecting an output voltage at a time at which it is determined that the output voltage converges, as the threshold value based on a determination that the door is closed.

In some implementations, the operation determination value can be calculated by an equation $$DIFF = \text{Slope} \times \left( THR - \frac{\text{Y-intercept}}{\text{Slope}} \right),$$

where the DIFF denotes the operation determination value, the THR denotes the threshold value, the slope denotes operation determination value change amount/threshold value change amount, the y-intercept denotes a point where a y-axis representing the operation determination value meets a straight line of the equation, the slope has a positive number less than 1, and the y-intercept has a negative number. In some examples, the slope can be 1/10 and the y-intercept can be −55.

In some implementations, the magnetic field sensor can be provided in plurality, the plurality of magnetic field sensors being disposed at an upper portion and a lower portion of the main body, respectively, and the magnet can be provided in plurality, the plurality of magnets being disposed at an upper portion and a lower portion of the door, respectively. In some implementations, the method can further include after selecting the output voltage as a threshold value and before selecting the operation determination value of the door, determining a polarity of the magnet by comparing the threshold value with a magnet polarity determination voltage value, and selecting a different operation determination value of the door for each polarity. In some implementations, the magnetic field sensor can be disposed at the door, and the magnet can be disposed at the main body.

BRIEF DESCRIPTION OF DRAWINGS

FIG. 1 is a diagram illustrating an example of a state in which one magnetic field sensor and one magnet are mounted to a main body and a door of a refrigerator, respectively.

FIG. 2 is a diagram illustrating an example of a state in which two magnetic field sensors and two magnets are mounted to the main body and the door of the refrigerator, respectively.

FIG. 3 is a diagram illustrating an example of a state in which a plurality of magnetic field sensors are mounted to the main body of the refrigerator.

FIG. 4 is a diagram illustrating an example of a state in which the magnet is mounted to the door in FIG. 2.

FIG. 5 is a diagram illustrating an enlarged conceptual view of an example of a portion of the door to which the magnet is mounted in FIG. 4.

FIG. 6 is a diagram illustrating an example of a magnet module by enlarging part VI in FIG. 5.

FIG. 7 is a diagram illustrating an exploded view of an example of a state in which the magnet is disassembled from a magnet housing in FIG. 6.

FIG. 8 is a diagram illustrating a cross-sectional view taken along the line VIII-VIII of FIG. 6.

FIG. 9 is a diagram illustrating a cross-sectional view taken along the line IX-IX of FIG. 6.

FIG. 10 is a diagram illustrating an example of a state in which a plurality of magnetic field sensors are mounted to the main body in FIG. 2.

FIG. 11 is a diagram illustrating a rear view of an example of a state in which a first magnetic field sensor module is mounted to a first sensor cover in FIG. 10.

FIG. 12 is a diagram illustrating an exploded view of an example of a state in which the first magnetic field sensor module is disassembled from the first sensor cover in FIG. 11.

FIG. 13 is a diagram illustrating an example of the first magnetic field sensor module of FIG. 12, viewed from the front.

FIG. 14 is a diagram illustrating an exploded view of an example of a state in which a grill is disassembled from the main body in FIG. 10.

FIG. 15 is a diagram illustrating an example of a state in which a second magnetic field sensor module is disposed on the grill in FIG. 14.

FIG. 16 is a block diagram illustrating an example of a control device for an automatic door.

FIG. 17 is a diagram illustrating an example of relationship between an analog Hall sensor and a magnet.

FIG. 18 is a graph showing an example of changes in output voltage of the sensor according to polarities of the magnet.

FIG. 19 is a diagram illustrating example of changes in distance between the magnetic field sensor and the magnet when the door is open, closed, and pressed.

FIG. 20 is a graph showing an example of a magnitude of a sensor output voltage according to the change in the distance between the sensor and the magnet when the door is open and closed.

FIG. 21 is a flowchart illustrating an example of a method of controlling an automatic door using a single magnetic field sensor.

FIG. 22 is a graph showing an example of changes in sensor output voltage according to changes in distance between the magnet and the sensor.

FIG. 23 is a graph showing an example of a change in distance sensitivity for each output voltage.

FIG. 24 is a graph showing an example of the output voltage of the sensor when the door is open, closed, and pressed.

FIG. 25 is a graph showing an example of a decrease in an operation determination value with respect to the same threshold value when only a y-intercept is changed in an equation of a door operation determination value.

FIG. 26 is a graph showing an example that the operation determination value has a negative value when only a slope is changed in the equation of the door operation determination value.

FIG. 27 is a graph for explaining an example of a method of changing an actual slope in the equation of the door operation determination value.

FIG. 28 is a flowchart illustrating an example of a method of controlling an automatic door using a plurality of magnetic field sensors.

FIG. 29 is a graph showing an example of an instantaneous change in output voltage due to an external factor.

FIG. 30 is a flowchart illustrating an example of an automatic door control method.

FIGS. 31A and 31B are flowcharts illustrating an example of an automatic door control method.

DETAILED DESCRIPTION

FIG. 1 is a diagram illustrating an example of a state in which a magnetic field sensor 152 and a magnet 143 are mounted to a main body 100 and a door 120 of a refrigerator, respectively.

FIG. 2 is a diagram illustrating an example of a state in which two magnetic field sensors 152 and 170 and two magnets 143 are mounted to the main body 100 and the door 120 of the refrigerator, respectively.

FIG. 3 is a diagram illustrating an example of a state in which the plurality of magnetic field sensors 152 and 170 are mounted to the main body 100 of the refrigerator.

The refrigerator can include a main body 100, a door 120, a door drive module 123, a sensor unit 130, and a controller 192.

The main body 100 can include an inner case 102, an outer case 101, and an insulator 103.

The outer case 101 can define appearance of the refrigerator. The outer case 101 can define the appearance of upper, lower, rear, right, and left surfaces of the refrigerator. The door 120 provided on the front of the main body 100 can define the front surface of the refrigerator.

The inner case 102 can be disposed at an inner side of the outer case 101. The inner case 102 can define a storage container 104 configured to receive food items at a low temperature. The outer case 101 can surround the inner case 102.

The insulator 103 can be disposed between the inner case 102 and the outer case 101. The insulator 103 can have made of polyurethane foam. The insulator 103 can block the transfer of heat from a relatively warmer external environment to a relatively cooler storage container 104.

In order to reduce a temperature of the storage container 104 of the refrigerator, a refrigeration cycle device including a compressor can be disposed in the refrigerator. The refrigeration cycle device can include a compressor, a condenser, an expander and an evaporator.

The evaporator can induce heat exchange between air and refrigerant to generator cool air in the storage container 104. Air can be circulated by a fan. The compressor can compress refrigerant into a high temperature and high pressure state, and the compressed refrigerant can circulate through components of the refrigeration cycle device, including the evaporator.

The door 120 can be coupled to one side of the front of the main body 100 by a hinge so as to be rotatable with respect to the main body 100. The door 120 can open and close the storage container 104 of the refrigerator. A handle 121 can be provided at a left end portion of the front surface of the door 120. The handle 121 can allow a user to open and close the door 120 by pulling or pushing the handle 121.

A gasket can be disposed between the door 120 and the main body 100. The gasket can be made of an elastic rubber material. The gasket can be disposed at an inner edge of the door 120 and configured to seal a gap between the door 120 and the main body 100.

The main body 100 can include a refrigerating chamber 105 and a freezing chamber 106. The refrigerating chamber 105 and the freezing chamber 106 can be partitioned in a top-down direction or a left and right direction of the main body 100.

The door 120 can be provided in plurality. The plurality of doors 120 can include a refrigerating chamber door 120 mounted on the main body 100 to open and close the refrigerating chamber 105 and a freezing chamber door 120 mounted on the main body 100 to open and close the freezing chamber 106.

The door (doors) 120 can be opened or closed by a user or can be automatically opened by an automatic door drive module 123 when the door 120 is pressed.

The door drive module 123 can be mounted at a left or right side of an upper end of the main body 100. In some implementations, the door drive module 123 can be disposed at the right side of the upper end of the main body 100.

The door drive module 123 can be disposed adjacent to a side edge on which the hinge is disposed.

The door drive module 123 can include a drive motor configured to provide power, a plurality of gears configured to transmit the power, and a push part.

The drive motor can utilize electrical energy to supply power for opening the door 120 using electric energy.

The push part can be configured to push the door 120 to open the door 120.

A rack gear can be provided on one side of the push part. The plurality of gears can be engaged with the rack gear. The plurality of gears can be connected to the drive motor to transmit power to the push part through the rack gear.

The push part can be operated by the power transmitted to the rack gear, to push one side of a hinge assembly, such that the door 120 can be open.

In some implementations, when the user lightly presses one side of the door 120 without applying a force to open the door 120, the door drive module 123 can automatically open the door 120 using electric energy.

FIG. 4 is a diagram illustrating an example of a state in which the magnet 143 is mounted to the door 120 in FIG. 2.

FIG. 5 is a diagram illustrating an enlarged conceptual view of an example of a portion of the door 120 to which the magnet 143 is mounted in FIG. 4.

FIG. 6 is a diagram illustrating an example of a magnet module 131 by enlarging part VI in FIG. 5.

FIG. 7 is a diagram illustrating an exploded view of an example of a state in which the magnet 143 is disassembled from a magnet housing 134 in FIG. 6.

FIG. 8 is a diagram illustrating a cross-sectional view taken along the line VIII-VIII of FIG. 6.

FIG. 9 is a diagram illustrating a cross-sectional view taken along the line IX-IX of FIG. 6.

The control device of the automatic door 120 can include a sensor unit 130, a controller 192 (see FIG. 27), and an automatic door drive module 123.

The sensor unit 130 and the door drive module 123 can be disposed at opposite sides of the main body 100 in the left and right direction. In some implementations, when viewed from the front side of the refrigerator, the door drive module 123 can be disposed at a right end portion of the main body 100 and the sensor unit 130 can be disposed at a left end portion of the main body 100.

The sensor unit 130 can include a magnet 143 (permanent magnet) and a magnetic field sensor 152, 170.

The magnet 143 can be mounted to the door 120 and the magnetic field sensor 152 can be mounted to the main body 100, or the magnetic field sensor can be mounted to the door 120 and the magnet can be mounted to the main body 100.

In some implementations, the magnet 143 is mounted to the door 120 and the magnetic field sensor 152, 170 is mounted to the main body 100.

The magnet 143 and the magnetic field sensor 152, 170 can be disposed at upper end portions of the door 120 and the main body 100 and arranged to face each other in a front and rear direction when the door 120 is closed.

The magnet 143 can be provided on the door 120, either as a single magnet (FIG. 1) or in multiple instances (FIG. 2).

The magnetic field sensor 152 can be provided at the main body 100, either as a single sensor (FIG. 1) or in multiple instances (FIG. 2).

In some implementations, when the refrigerating chamber 105 and the freezing chamber 106 are partitioned in the left and right sides of the main body 100 (FIG. 3), the magnetic field sensor 152, 170 can be provided as a single sensor at each of the left and right sides of the main body 100 or can be provided in multiple instances at each of upper and lower portions of the left and right sides of the main body 100.

In some implementations, when the refrigerating chamber door 120 and the freezing chamber door 120 are separately provided on the main body 100), the magnet 143 can be provided as single magnet on each of the refrigerating chamber door 120 and the freezing chamber door 120 or can be provided in multiple instances on upper and lower portions of each of the refrigerating chamber door 120 and the freezing chamber door 120.

The magnetic field sensor 152 can be an analog Hall sensor. The analog Hall sensor can be a sensor whose output voltage varies depending on a magnitude of a magnetic field.

The magnetic field sensor 152 and the magnet 143 can be spaced apart from each other in the front and rear direction. The magnetic field sensor 152 can detect variations in a magnetic field intensity, which correspond to changes in distance from the magnet 143, to thereby determine the extent or level of door 120 pressing, indicating the amount of pressure applied to the door 120.

In some implementations, since the plurality of magnetic field sensors 152 and 170 are disposed in the upper and lower portions of the main body 100, a deviation in detecting the pressed amount of the door 120 can be reduced, compared to the single magnetic field sensor 152.

The magnet module 131 can be disposed at a rear surface of the door 120.

The magnet module 131 can include a first magnet module 132 and a second magnet module 133.

The first magnet module 132 can be disposed on an upper portion of the door 120, and the second magnet module 133 can be disposed on a lower portion of the door 120.

In some implementations, only one of the first magnet module 132 and the second magnet module 133 may be installed on the door 120. For example, only the first magnet module 132 may be installed on the upper portion of the door 120 or only the second magnet module 133 may be installed on the lower portion of the door 120.

In some implementations, since the first magnet module 132 and the second magnet module 133 possess the same or similar configuration, differing only in their installation positions at the door 120, the first magnet module 132 and the second magnet module 133 may be collectively referred to as the magnet module 131.

The magnet module 131 can include a magnet housing 134 and a magnet 143.

The magnet 143 can have a rectangular bar shape. The magnet 143 can have a long and rectangular cross-sectional shape.

The magnet 143 can extend from the rear surface of the door 120 toward the inside of the main body 100 in the front and rear direction and can be horizontally disposed.

The magnet 143 can have an N pole 1432 and an S pole 1431. The magnet 143 can be disposed to have the S pole 1431 facing the magnetic field sensor 152 and the N pole 1432 facing an opposite direction to the magnetic field sensor 152.

The magnet housing 134 can accommodate the magnet 143.

The magnet housing 134 can include a first magnet housing 135 and a second magnet housing 142.

The first magnet housing 135 can include a magnet accommodating portion 136 therein. The magnet 143 can be accommodated in the magnet accommodating portion 136.

The first magnet housing 135 can have a rectangular shape. The first magnet housing 135 can surround front, left, right, and lower surfaces of the magnet 143. The first magnet housing 135 can have open upper and rear surfaces.

The second magnet housing 142 can be larger in size compared to the first magnet housing 135. The second magnet housing 142 can cover the rear surface of the first magnet housing 135 and a rear surface of the magnet 143.

The first magnet housing 135 and the second magnet housing 142 can define the magnet accommodating portion 136.

Left and right surfaces of the second magnet housing 142 can be bent and extended to cover portions of the side surfaces of the first magnet housing 135.

An extending portion 1421 can be disposed on a lower end portion of the second magnet housing 142.

The extending portion 1421 can extend from the lower end portion of the second magnet housing 142 and surround an outermost side of a lower end portion of the first magnet housing 135.

A front surface of the extending portion 1421 can be connected to the front surface of the first magnet housing 135, and left and right surfaces of the extending portion 1421 can extend to overlap the side surfaces of the first magnet housing 135 in the left and right direction.

The extending portion 1421 can extend from the left and right surfaces of the second magnet housing 142 to define a rectangular box structure.

In some implementations, the extending portion 1421 can connect the first magnet housing 135 and the second magnet housing 142, forming the rectangular box structure, thereby achieving a simple structure that can withstand external shocks and enhance overall durability.

A magnet cover 144 can be mounted on an upper portion of the first magnet housing 135. The magnet cover 144 can cover upper openings 177 (see FIG. 25) of the first magnet housing 135.

An inner surface of the upper portion of the first magnet housing 135 can surround edge portions of the magnet cover 144.

The magnet cover 144 can be fitted into the inner surface of the first magnet housing 135.

A plurality of locking protrusions 145 can be disposed on edge portions of the magnet cover 144.

The plurality of locking protrusions 145 can protrude downward from both sides of the magnet cover 144 toward the inside of the first magnet housing 135.

The locking protrusions 145 can have a hook shape. Each of the locking protrusions 145 can have a lower end portion that acts as a free end, which is elastically supported on the magnet cover 144.

A plurality of elastic grooves 146 can be provided at portions of the magnet cover 144, to which upper end portions of the locking protrusions 145 are connected, to be concave or recessed in the left and right direction of the magnet cover 144. The elastic grooves 146 can enable the locking protrusions 145 to flex more elastically toward the inner surface of the magnet cover 144.

A plurality of locking holes 137 can be defined at the left and right surfaces of the first magnet housing 135. The locking holes 137 and the locking protrusions 145 can face each other.

In some implementations, when the magnet cover 144 is fitted to cover the upper end portion of the first magnet housing 135, the locking protrusions 145 can be inserted into the locking holes 137, so that the magnet cover 144 can be coupled to the upper sides of the first magnet housing 135 and the second magnet housing 142.

In some implementations, the first and second magnet housings 142 and the magnet cover 144 can surround the magnet 143 accommodated in the magnet accommodating portion 136 in all directions, thereby protecting the magnet from external impacts.

A plurality of seating protrusions 138 can be provided at the magnet accommodating portion 136 of the first magnet housing 135. The magnet 143 can be received at the plurality of seating protrusions 138.

The plurality of seating protrusions 138 can protrude upward from a bottom surface of the magnet accommodating portion 136 so as to contact portions of a lower surface of the magnet 143. The seating protrusions 138 can have a rectangular cross-sectional shape and extend in an up and down direction. Each of the seating protrusions 138 can have a flat upper surface.

The plurality of seating protrusions 138 can be spaced apart from each other along a lengthwise direction of the magnet 143.

A stopper 139 can protrude upward in the magnet accommodating portion 136 of the first magnet housing 135. The stopper 139 can be spaced apart from the seating protrusion 138 at a forward distance, which is located at an opposite side to the second magnet housing 142, among the plurality of seating protrusions 138.

The stopper 139 can be disposed to be contactable with the front surface of the magnet 143. An inner surface of the second magnet housing 142 can be disposed to be in contact with the rear surface of the magnet 143.

The magnet 143 seated on the plurality of seating protrusions 138 can be located between the stopper 139 and the inner surface of the second magnet housing 142.

In some implementations, the stopper 139 can limit movement of the magnet 143 in the front and rear direction of the first magnet housing 135.

A plurality of pressing protrusions 147 can be disposed on an inner surface of the magnet cover 144. The plurality of pressing protrusions 147 can protrude downward from the inner surface of the magnet cover 144 and can contact portions of the upper surface of the magnet 143. The magnet 143 can be located between the pressing protrusions 147 and the seating protrusions 138.

The plurality of pressing protrusions 147 can be evenly spaced apart from each other in the lengthwise direction of the magnet 143.

In some implementations, when the magnet cover 144 is coupled to the first and second magnet housings 142 and 135, the plurality of pressing protrusions 147 can press the upper surface of the magnet 143.

In some implementations, the plurality of pressing protrusions 147 can suppress the magnet 143 seated on the seating protrusions 138 from moving up and down in the magnet accommodating portion 136 when the door 120 is closed or open.

The plurality of pressing protrusions 147 and the plurality of seating protrusions 138 can be alternately arranged on the upper and lower surfaces of the magnet 143 in the up and down direction without overlapping each other.

In some implementations, the plurality of pressing protrusions 147 can distribute a pressing force, which is applied to the upper surface of the magnet 143, uniformly in the lengthwise direction of the magnet 143, thereby maintaining a fixed state of the magnet 143.

In some examples, in a case where the pressing protrusions 147 and the seating protrusions 138 are disposed to overlap each other in the up and down direction, if the pressing force of the pressing protrusions 147 and a drag force of the seating protrusions 138 are excessively applied to the upper and lower surfaces of the magnet 143, the magnet 143 may be damaged.

Accordingly, when the magnet cover 144 and the first and second magnet housings 142 and 135 are assembled, these protrusions can reduce impacts transferred to the magnet 143 while ensuring the magnet 143 remains securely fixed in place.

Coupling grooves 140 can be provided in lower end portions of the first magnet housing 135 and the second magnet housing 142, respectively.

The coupling grooves 140 can extend upward from the lower end portions of the first magnet housing 135 and the second magnet housing 142, respectively. The coupling grooves 140 that are provided on the side surfaces of the second magnet housing 142 can extend to cross the lower portion of the first magnet housing 135 in the left and right direction.

A fixing bracket 122 configured to fix the magnet 143 can be disposed on an upper portion of a rear surface of the door 120. The fixing bracket 122 can protrude from the upper portion of the rear surface of the door 120 to be inserted into the coupling grooves 140.

In some implementations, since the fixing bracket 122 is inserted into the coupling grooves 140, the first and second magnet housings 142 and 135 can be coupled to the upper portion of the rear surface of the door 120.

A plurality of reinforcing ribs 141 can be disposed between the both coupling grooves 140.

The plurality of reinforcing ribs 141 can protrude from the inner surface of the second magnet housing 142 toward the fixing bracket 122.

The plurality of reinforcing ribs 141 can be spaced apart from each other in the left and right direction on the inner surface of the second magnet housing 142.

In some implementations, the plurality of reinforcing ribs 141 can improve rigidity of the second magnet housing 142.

In some implementations, when the fixing bracket 122 is inserted into the coupling grooves 140, the fixing bracket 122 can be press-fitted into the coupling grooves 140 along the plurality of reinforcing ribs 141 without contacting the inner surface of the second magnet housing 142, which may result in improving close-coupling performance between the fixing bracket 122 and the magnet housing 134.

FIG. 10 is a diagram illustrating an example of a state in which a plurality of magnetic field sensors 152 and 170 are mounted to the main body in FIG. 2.

FIG. 11 is a diagram illustrating a rear view of an example of a state in which the first magnetic field sensor module 150 is mounted to a first sensor cover 162 in FIG. 10.

FIG. 12 is a diagram illustrating an exploded view of an example of a state in which the first magnetic field sensor module 150 is disassembled from the first sensor cover 162 in FIG. 11.

FIG. 13 is a diagram illustrating an example of the first magnetic field sensor module 150 of FIG. 12, viewed from the front.

A magnetic field sensor module 148 can include a first magnetic field sensor module 150 and a second magnetic field sensor module 168.

The first magnetic field sensor module 150 can be mounted to an upper portion of the main body 100. The second magnetic field sensor module 168 can be mounted to a lower portion of the main body 100.

In some implementations, only one of the first magnetic field sensor module 150 and the second magnetic field sensor module 168 may be mounted to the main body 100. For example, only the first magnetic field sensor module 150 may be disposed in the upper portion of the main body 100 or only the second magnetic field sensor module 168 may be disposed in the lower portion of the main body 100 (not illustrated).

A sensor accommodating portion 149 can be provided at an upper end portion of the front surface of the main body 100. The first magnetic field sensor module 150 can be disposed in the sensor accommodating portion 149. The sensor accommodating portion 149 may have an open front facing toward the main body 100.

The first magnetic field sensor module 150 can include a first magnetic field sensor assembly 151, a first sensor housing 156, and a first sensor cover 162.

The first magnetic field sensor assembly 151 can include a first magnetic field sensor 152, a first Printed Circuit Board (PCB) 153, and a wire connector.

The first PCB can may be an electric/electronic component for operating the first magnetic field sensor 152. The first magnetic field sensor 152 can be mounted on the first PCB 153.

The first PCB 153 can include a first accommodating connector for connecting the wire connector. The wire connector can be inserted into the first accommodating connector. The first accommodating connector and the wire connector can be coupled by a hook coupling hole and a hook. A hook coupling hole can be defined at the first accommodating connector, and the hook can be provided at the wire connector to be coupled to the hook coupling hole.

The first sensor housing 156 can accommodate the first magnetic field sensor assembly 151. The first sensor housing 156 can have a rectangular shape.

The first sensor housing 156 can define an accommodation space therein, the accommodation space configured to receive the first accommodating connector and the wire connector.

The first sensor housing 156 can have a rectangular box shape. The first sensor housing 156 can surround upper and lower surfaces, a rear surface, and one side surface of the first accommodating connector. The first sensor housing 156 can have an open front surface.

A PCB mounting portion 157 can be disposed on the front surface of the first sensor housing 156. The PCB mounting portion 157 can protrude from upper and lower ends of the first sensor housing 156 to cover edges of the first PCB 153. The first PCB 153 can be slidably mounted to an inner side of the PCB mounting portion 157.

An inlet can be provided at one end portion of the PCB mounting portion 157. Accordingly, the first PCB 153 can be inserted into the PCB mounting portion 157 through the inlet.

A stop protrusion 158 can protrude from another end portion of the PCB mounting portion 157. The stop protrusion 158 may stop one end portion of the first PCB 153, blocking the first PCB 153 from sliding out of the PCB mounting portion 157 in one side direction when the first PCB 153 is being inserted into the PCB mounting portion 157.

A plurality of support protrusions 159, 160, 161 can be provided on the PCB mounting portion 157. The plurality of support protrusions 159, 160, and 161 can support portions of a front surface of the first PCB 153.

The first support protrusion 159 among the plurality of support protrusions 159, 160, and 161 can protrude downward from an upper end portion of the PCB mounting portion 157 to support an upper end portion of the first PCB 153.

The second support protrusion 160 among the plurality of support protrusions 159, 160, and 161 can protrude upward from a lower end portion of the PCB mounting portion 157 to support a lower end portion of the first PCB 153.

The third support protrusion 161 among the plurality of support protrusions 159, 160, and 161 can protrude from the stop protrusion 158 to cover a right end portion of the first PCB 153.

In some implementations, the plurality of support protrusions 159, 160, and 161 can cover three portions of the first PCB 153 mounted to the PCB mounting portion 157, namely, the upper end portion, the lower end portion, and the right end portion of the first PCB 153, thereby blocking the first PCB 153 from being separated from the PCB mounting portion 157 to the outside of the first sensor housing 156.

The plurality of support protrusions 159, 160, and 161 and the stop protrusion 158 can suppress the first PCB 153 mounted to the PCB mounting portion 157 from moving back and forth and to right and left. This can reduce external vibration transmitted to the first PCB 153 and the first magnetic field sensor 152.

The first PCB 153 can be vertically disposed to cover a portion of the open front surface of the first sensor housing 156.

The first magnetic field sensor 152 can be disposed on the front surface of the first PCB 153 toward the first sensor cover 162.

A wire lead-in portion 1561 can be provided at one side of the first sensor housing 156. The wire lead-in portion 1561 can configured to guide the wire into the first sensor housing 156.

The wire lead-in portion 1561 can have an arcuate shape.

A wire fixing protrusion 1562 can be provided at an inlet of the wire lead-in portion 1561. The wire fixing protrusion 1562 can protrude downward from an upper end of the wire lead-in portion 1561. A wire insertion opening 1563 can be defined between a lower end portion of the wire fixing protrusion 1562 and a lower end portion of the wire lead-in portion 1561.

Accordingly, the wire can be inserted between the wire fixing protrusion 1562 and the wire lead-in portion 1561 through the wire insertion opening 1563, so as to be fixed in the wire lead-in portion 1561 by the wire fixing protrusion 1562.

The first sensor cover 162 can be rotatably mounted on a front surface of the sensor accommodating portion 149 to open and close the open front surface of the sensor accommodating portion 149.

The first sensor cover 162 can have a rectangular plate shape. The first sensor cover 162 can be elongated in the left and right direction. The first sensor cover 162 can be a larger in size compared to the first sensor housing 156.

The first sensor housing 156 can be mounted on an inner surface of the first sensor cover 162. A plurality of mounting protrusions 163 can be provided on the inner surface of the first sensor cover 162. The plurality of mounting protrusions 163 can protrude from the inner surface of the first sensor cover 162 toward the inside of the sensor accommodating portion 149 so as to cover upper and lower edges of the PCB mounting portion 157.

The plurality of mounting protrusions 163 can be spaced apart from each other in the up and down direction and the left and right direction on the inner surface of the first sensor cover 162 and support four corners of the PCB mounting portion 157.

The plurality of mounting protrusions 163 can have a hook shape, and can cover a rear surface of the PCB mounting portion 157 so as to support the first sensor housing 156.

In some implementations, since the plurality of mounting protrusions 163 can have a cantilever shape, the first sensor housing 156 can flex elastically in the up and down direction when it is mounted on the first sensor cover 162.

For example, the plurality of mounting protrusions 163 having the hook shape may be spread out by the upper and lower surfaces of the PCB mounting portion 157 and then restored to their original positions when the first sensor housing 156 is mounted, thereby supporting the PCB mounting portion 157.

In addition, the plurality of mounting protrusions 163 can suppress the PCB mounting portion 157 from moving in the up and down direction on the inner surface of the first sensor cover 162 or from being separated backward.

A plurality of movement-limiting protrusions 164 and 165 can be disposed on the inner surface of the first sensor cover 162.

The first movement-limiting protrusion 164 of the plurality of movement-limiting protrusions 164 and 165 can protrude toward the inside of the sensor accommodating portion 1490 to cover one side surface (left surface) of the PCB mounting portion 157.

The second movement-limiting protrusion 165 of the plurality of movement-limiting protrusions 164 and 165 can protrude toward the inside of the sensor accommodating portion 149 to cover one side surface (right surface) of the first PCB 153.

The plurality of movement-limiting protrusions 164 and 165 can be disposed at a middle portion between the plurality of mounting protrusions 163 spaced apart in the up and down direction. The plurality of movement-limiting protrusions 164 and 165 can be spaced apart from each other in a lengthwise direction of the PCB mounting portion 157.

In some implementations, the plurality of movement-limiting protrusions 164 and 165 can block one side surface of the PCB mounting portion 157 and one side surface of the first PCB 153, respectively, so that the first sensor housing 156 can be blocked from moving in the left and right direction on the inner surface of the first sensor cover 162.

Accordingly, the plurality of mounting protrusions 163 and movement-limiting protrusions 164 and 165 can ensure a secure and fixed position of the first sensor housing 156 mounted on the first sensor cover 162.

The first sensor cover 162 can cover the first PCB 153 and the first magnetic field sensor 152 to block external impacts from damaging the first PCB 153 and the first magnetic field sensor 152.

A plurality of hinge portions 166 can be disposed on upper and lower portions of one side of the first sensor cover 162, respectively. The hinge portions 166 can have a C-like shape or a hook shape. One side of each of the hinge portions 166 can be integrally formed with the first sensor cover 162. A hinge protrusion 1661 can protrude from another side of each of the hinge portions 166 in the up and down direction.

The hinge protrusions 1661 can function as a central axis, enabling the rotational movement of the first sensor cover 162. The first sensor cover 162 can rotate in the front and rear direction, with the hinge protrusions 1661 serving as the pivot point.

The C-shaped or hook-shaped structure of the hinge portions 166 can avoid interference with the sensor accommodating portion 149 when one side of the first sensor cover 162 rotates with respect to the hinge protrusions 1661.

A protruding portion 167 can protrude from the inner surface of the first sensor cover 162 toward the inside of the sensor accommodating portion 149 and extend along edges of the first sensor cover 162. One side of each of the hinge portions 166 can be connected to one end portion of the protruding portion 167.

The protruding portion 167 can be inserted into the inner surface of the sensor accommodating portion 149.

Upper and lower surfaces and one side surface of the protruding portion 167 can overlap the inner surface of the sensor accommodating portion 149 in the up and down direction and the left and right direction when the first sensor cover 162 is closed.

In some implementations, the protruding portion 167 can maintain a secure coupling between the first sensor cover 162 and the sensor accommodating portion 149 when the first sensor cover 162 is closed, and reduce any shaking or movement of the first sensor cover 162 caused by external impacts.

FIG. 14 is diagram illustrating an exploded view of an example of a state in which a grill 113 is disassembled from the main body 100 in FIG. 10.

FIG. 15 is a diagram illustrating an example of a state in which the second magnetic field sensor module 168 is disposed on the grill 13 in FIG. 14.

A machine room 107 can be defined in the lower portion of the main body 100. A compressor, a condenser, a fan, and the like can be disposed in the machine room 107.

A plurality of frames 108 can be vertically disposed at both left and right sides of the machine room 107.

A plurality of support brackets 109 for fixing the grill 113 to the frames 108 can be provided.

The support brackets 109 can have an L-shape cross-section. The support bracket 109 can be fixed to an edge of one side of each of the frames 108.

A plurality of fixing members 110 can protrude from each of the support brackets 109 toward the front of the frames 108.

Each of the plurality of fixing members 110 can include a first fixing member 111 and a second fixing member 112 that are disposed on the support bracket 109 to be spaced apart from each other in the up and down direction.

The first fixing members 111 can be connected to an upper portion of the grill 113. The second fixing members 112 can be connected to a lower portion of the grill 113. The first and second fixing members 111 and 112 can have a plate shape.

The grill 113 can be disposed on the front of the frames 108. The grill 113 can be disposed vertically at the front of the machine room 107.

The first fixing members 111 can be connected to a plurality of first support plates 190 and the second fixing members 112 can be coupled to a connection bar, so as to support the grill 113.

The grill 113 can include a plurality of vertical plates 1131, 1132, and 1133, a plurality of blades 114, and a connection bar.

The plurality of vertical plates 1131, 1132, and 1133, which have a plate shape, can extend upward from a bottom surface of the machine room 107 and can be disposed vertically.

The plurality of vertical plates 1131, 1132, and 1133 may be provided in three pieces. Among the plurality of vertical plates 1131, 1132, and 1133, the first vertical plate 1131 and the second vertical plate 1132 can be disposed at both left and right ends of the machine room 107, respectively, and the third vertical plate 1133 can be disposed at a middle portion between the first and second vertical plates 1131 and 1132.

The plurality of vertical plates 1131, 1132, and 1133 can extend in the front and rear direction of the machine room 107.

A front end and a rear end of each of the first vertical plate 1131 and the second vertical plate 1132 can be bent toward each other in the left and right direction. The first and second vertical plates 1131 and 1132 can have a U-shaped cross-sectional from and extend in the up and down direction.

The third vertical plate 1133 can have an H-shaped cross-sectional form and extend in the up and down direction.

The plurality of blades 114 can extend to be elongated in the left and right direction of the main body 100. The blades 114 can have a plate shape. The blades 114 can be disposed to be inclined with respect to a vertical plane. A first edge portion can be provided on an upper side of each blade 114 and can extend horizontally with respect to an inclined surface of the blade 114. A second edge portion can be provided on a lower side of each blade 114 and can extend vertically with respect to the inclined surface of the blade 114.

The blade 114 can be inclined at a first inclination angle with respect to the first edge portion and inclined at a second inclination angle with respect to the second edge portion. The first inclination angle and the second inclination angle may be different from each other.

The plurality of blades 114 can be disposed between the adjacent vertical plates of the plurality of vertical plates 1131, 1132, and 1133, and both end portion of each blade 114 may be respectively coupled to the vertical plates.

The connection bar can be disposed beneath the plurality of vertical plates 1131, 1132, and 1133, to connect the plurality of vertical plates 1131, 1132, and 1133 in the left and right direction. The connection bar can have a U-shaped cross-sectional form, with one side open, and extend to be elongated in the left and right direction of the main body 100.

Both end portions of the connection bar can be respectively coupled to the first vertical plate 1131 and the second vertical plate 1132 by coupling members such as screws. A lower end portion of the third vertical plate 1133 can be inserted into an insertion groove provided in a middle portion of the connection bar.

A plurality of second fixing plates 1121 can be provided on front end portions of the plurality of second fixing members 112 to be inclined upward with respect to a horizontal plane.

A plurality of coupling holes can be defined at the plurality of second fixing plates 1121.

A plurality of second support plates can be disposed on the connection bar. The plurality of second support plates can be inclined upward toward the front with respect to a horizontal plane of the connection bar.

A plurality of coupling holes can be defined at the second support plates.

The coupling holes of the second fixing plates 1121 and the coupling holes of the second support plates may overlap each other.

Coupling members such as screws can be coupled to the second fixing plates 1121 and the second support plates through the coupling holes of the second fixing plates 1121 and the coupling holes of the second support plates. Accordingly, the connection bar can be coupled to the second fixing plates 1121 through the second support plates so as to be supported thereby.

The plurality of blades 114 can be spaced apart from each other in the up and down direction of the vertical plates.

In some implementations, external air of the machine room 107 can be introduced into the machine room 107 or internal air of the machine room 107 can flow out of the machine room 107, through a gap between the blades 114.

The second magnetic field sensor module 168 can be mounted on the grill 113.

FIG. 16 is a block diagram illustrating an example of a control device for an automatic door 120.

FIG. 17 is a diagram illustrating an example of relationship between an analog Hall sensor and the magnet 143.

FIG. 18 is a graph showing an example of changes in output voltage of the sensor according to polarities of the magnet 143.

FIG. 19 is a diagram illustrating examples of changes in distance between the magnetic field sensor and the magnet 143 when the door is open, closed, and pressed.

FIG. 20 is a graph showing an example of a magnitude of a sensor output voltage according to the change in the distance between the sensor and the magnet 143 when the door 120 is open and closed.

The S pole 1431 of the magnet 143 can be disposed at a distance from the magnetic field sensor in a direction that faces the magnetic field sensor when the door 120 is closed, and the N pole 1432 of the magnet 143 can be disposed in an opposite direction relative to the magnetic field sensor.

The magnet 143 can exhibit an increase in magnetic flux density toward each pole and a decrease in magnetic flux density as one moves away from each pole (see FIG. 17).

An output voltage of the magnetic field sensor may be increased closer to the S pole 1431 of the magnet 143 (FIG. 18). The output voltage of the magnetic field sensor may be decreased away from to the S pole 1431 of the magnet 143.

If the N pole 1432 of the magnet 143 is disposed to face the magnetic field sensor and the S pole 1431 of the magnet 143 is disposed in the opposite direction to the magnetic field sensor due to mis-assembly of the magnet 143, the output voltage of the magnetic field sensor may be decreased closer to the N pole 1432 of the magnet 143 when the door 120 is closed (FIG. 18). The output voltage of the magnetic field sensor may be increased away from the N pole 1432 of the magnet 143 (see FIG. 18).

An analog Hall sensor can output both an analog signal and a digital signal.

In some implementations, when the door 120 is closed, a distance between the magnetic field sensor and the magnet 143 may be 6 mm.

In some implementations, when the door 120 is 10 mm apart from the main body 100, the distance GAP between the magnetic field sensor of the main body 100 and the magnet 143 of the door 120 may be 16 mm and the output voltage of the magnetic field sensor may be 552 AD.

AD may refer to an analog to digital signal, which is a digitized voltage (analog) value. In some implementations, AD can digitize any voltage value in the range of 0 to 5V by 10 bits into 1024 steps.

AD can be expressed by an equation as follows.

$$AD=V\times1024/5$$

For example, when an output voltage of a sensor is 5V, 5V may be converted into 1024 AD.

$$5V\rightarrow5V\times1024/5=1024\ AD$$

When an output voltage of a sensor is 3.5V, 3.5V may be converted into 717 AD.

$$3.5V\rightarrow3.5V\times1024/5=717\ AD$$

The output voltage 552 AD may be set to a threshold value for determining whether the door 120 is open or closed.

In some implementations, when the door 120 is spaced apart from the main body 100 by 10 mm or more and a distance between the magnetic field sensor and the magnet 143 is 16 mm or more (GAP1), the output voltage of the magnetic field sensor may be lowered to 552 AD or less. This may be determined to be an open state of the door 120 (see FIG. 19).

In some implementations, when the door 120 is spaced apart from the main body 100 by 10 mm or less and a distance between the magnetic field sensor and the magnet 143 is 16 mm or less (GAP2), the output voltage of the magnetic field sensor may be higher than 552 AD. This may be determined to be a closed state of the door 120 (see FIGS. 31*a* and 31*b*).

In some implementations, when the user presses the door 120 in the closed state of the door 120, the distance between the magnet 143 and the magnetic field sensor may be changed due to elasticity of the gasket provided between the door 120 and the main body 100. The magnetic field sensor can detect a change in the distance between the door 120 and the magnetic field sensor by detecting intensity of a magnetic field generated by the magnet 143.

When the door 120 is pressed, a distance GAP3 between the magnet 143 and the magnetic field sensor may be decreased to be shorter than the distance GAP2 between the magnet 143 and the magnetic field sensor when the door 120 is closed. At this time, the output voltage of the magnetic field sensor may be further increased.

When the door 120 is no longer being pressed, the door drive module 123 can open the door 120 once an operating condition of the automatic door 120 is satisfied. However, if the operating condition of the automatic door 120 is not satisfied, the elastic force of the gasket restores the distance between the magnet 143 and the magnetic field sensor to its original state. Consequently, the output voltage of the magnetic field sensor can decrease further compared to the output voltage observed when the door 120 is pressed.

The output voltage of the magnetic field sensor may vary depending on a change in distance between the door 120 and the magnetic field sensor.

The controller 192 can control the door drive module 123.

The controller 192 can be connected to the magnetic field sensor electrically/electronically or to perform communication, so as to receive a detection signal from the magnetic field sensor.

The controller 192 can be connected to the drive motor of the door drive module 123 electrically/electronically or to perform communication, so as to control the drive motor.

The controller 192 can receive a detection signal from the magnetic field sensor to detect whether the door 120 is open or closed and a degree (or level) that the door 120 is pressed (a pressed amount of the door 120).

FIG. 21 is a flowchart illustrating an example of a method of controlling the automatic door 120 using the single magnetic field sensor 152.

FIG. 22 is a graph showing an example of changes in output voltage of the sensor according to changes in distance between the magnet 143 and the sensor.

FIG. 23 is a graph showing an example of a change in distance sensitivity for each output voltage.

FIG. 24 is a graph showing an example of the output voltage of the sensor when the door 120 is open, closed, and pressed.

The controller 192 can determine operational status of the automatic door 120, specifically whether the door drive module 123 operates to open the door 120 or not.

In some implementations, first, the magnetic field sensor 152 can periodically measure an output voltage SNR every preset time.

SNR: a current output voltage of the magnetic field sensor 152 (unit: AD)

The magnetic field sensor 152 can detect the S pole 1431 of the magnet 143. The output voltage of the sensor may decrease as the distance between the magnetic field sensor 152 and the S pole 1431 of the magnet 143 increases. The output voltage of the sensor may increase as the distance between the magnetic field sensor 152 and the S pole 1431 of the magnet 143 decreases.

The controller 192 can detect the change in the distance between the magnetic field sensor 152 of the main body 100 and the magnet 143 of the door 120 through the magnetic field sensor 152 in real time.

When the door 120 is not closed or is open, the controller 192 can verify a current state of the door 120, whether the door is in an open or closed state, ensuring that the automatic door 120 cannot be activated to open the door.

The controller 192 can determine whether the door 120 is open or closed by detecting the output voltage of the magnetic field sensor 152 (S10).

For example, when the door 120 is in the closed state, the distance between the magnetic field sensor 152 and the S pole 1431 of the magnet 143 may decrease and the output voltage of the magnetic field sensor 152 may increase accordingly. When the output voltage of the magnetic field sensor 152 is greater than a preset value (a threshold value for determining whether the door 120 is open or closed; e.g., 552 AD), the controller 192 may determine that the door 120 is in the closed state (S11).

When the door 120 is not closed or open, the distance between the magnetic field sensor 152 and the S pole 1431 of the magnet 143 may increase and the output voltage of the magnetic field sensor 152 may decrease accordingly. When the output voltage of the magnetic field sensor 152 is equal to or less than the preset value, the controller 192 may determine that the door 120 is in the open state (S17).

In a fully closed state of the door 120, a gap GAP between the magnet 143 and the magnetic field sensor 152 may be 6.0 mm. When the gap is 6.0 mm, the output voltage may be 670 AD.

As depicted in FIG. 23, distance sensitivity may refer to an amount of change in output voltage each time when a gap GAP is changed by 0.5 mm. The unit of the distance sensitivity may be AD/0.5 mm. The unit of the output voltage may be AD.

The distance sensitivity may not be constant but be proportional to a magnitude of the output voltage.

Next, when it is determined that the door 120 is in the closed state, the controller 192 may stand by to detect the operation of the door 120 (S11).

In a case where the user presses the door 120 to open the door 120, the controller 192 can control the door drive module 123 to open the automatic door 120 when the change in the output voltage of the magnetic field sensor 152 satisfies a specific condition.

For more stable operation determination of the automatic door 120, the controller 192 may select a threshold value THR for determining the operation of the automatic door 120 (S12).

THR: an automatic door operation threshold value of the magnetic field sensor 152.

DIFF: an automatic door operation determination value of the magnetic field sensor 152.

For example, the threshold value may be selected as an output voltage at a time when it is determined that the door 120 is in the closed state. The threshold value may be an output voltage (AD value) before the door 120 is pressed.

When the output voltage is 670 AD at a time at which it is determined that the door 120 is in the closed state, this value may be selected as a threshold value.

In some implementations, the output voltage of the sensor before the door 120 is pressed may always vary due to sample deviation or environmental difference.

Accordingly, the threshold value THR and the operation determination value DIFF may not be fixed but the operation determination value DIFF may be selected according to the threshold value THR (S13).

An equation for selecting the operation determination value of the automatic door 120 may be expressed as follows.

$$DIFF=(THR-550)/10 \qquad \text{[Equation 1]}$$

DIFF: an automatic door operation determination value (AD) and THR: a threshold value.

When the output voltage of the sensor is 670 AD at a time point at which it is determined that the door 120 is in the closed state before the door 120 is pressed, the threshold value may be 670 AD and the operation determination value may be (670−550)/10=12 AD.

Subsequently, the controller 192 can determine whether a difference between the threshold value and the output voltage is equal to or greater than the operation determination value (S14). The output voltage may be an output voltage measured by the magnetic field sensor 152 after the selection of the threshold value.

When it is determined that the difference between the threshold value and the output voltage is equal to or greater than the operation determination value, the controller 192 can operate the automatic door 120, that is, the door drive module 123.

For example, when the output voltage (unit: AD) is 685 AD and the threshold value is 670 AD at a time at which the door 120 is pressed, the difference between the output voltage and the threshold value may be 15(=685−670) AD which is greater than the operation determination value of 12 AD. Therefore, the controller 192 can operate the door drive module 123 to open the door 120.

When the output voltage is 680 AD and the threshold value is 670 AD at a time when the door 120 is pressed, the difference between the output voltage and the threshold value may be 10 AD which is less than the operation determination value of 12 AD. Therefore, the controller 192 may not operate the automatic door 120 and redetermine whether the door 120 is open or closed (S16).

The repeated check of the open or closed state of the door 120 may result from that the distance between the magnet 143 and the sensor in the closed state of the door 120 is changed when the user opens or closes the door 120 without operating the automatic door 120.

Next, when it is determined that the door 120 is in the closed state, the process may go back to the step of selecting the automatic door operation determination value.

When it is determined that the door 120 is in the open state, the controller 192 may stop the detection of the operation of the automatic door 120 and the process may go back to the start (S) (S13).

FIG. 25 is a graph showing an example of a decrease in an operation determination value with respect to the same threshold value when only a y-intercept is changed in an equation of the door operation determination value.

FIG. 26 is a graph showing an example that the operation determination value has a negative value when only a slope is changed in the equation of the door operation determination value.

FIG. 27 is a graph for explaining an example of a method of changing an actual slope in the equation of the door operation determination value.

Equation 1 can be expressed by an equation of a straight line as follows.

Equation of straight line:

$$DIFF=\frac{1}{10}\times THR-55$$

In an X-Y orthogonal coordinate system, the threshold value TEM may be an X-axis component, and the operation determination value DIFF may be a Y-axis component. 1/10 may denote a slope, and −55 may denote a Y-intercept.

Referring to FIG. 25, when the Y-intercept is reduced from −55 to −60, the equation of the straight line may be DIFF=(THR−600)/10.

When the Y-intercept is reduced to −60, the operation determination value may be decreased, compared to an operation determination value before the Y-intercept changes, with respect to the same threshold value.

According to the calculation equation of the operation determination value, when the Y-intercept is smaller at the same slope, the operation determination of the automatic door 120 may be more sensitive.

However, as illustrated in FIG. 25, since the operation determination value is a negative number below the threshold value of 600 AD, a problem may occur in determining the operation of the automatic door 120.

In some implementations, when the output voltage of the sensor is less than 552 AD, the controller 192 can determine that the door 120 is in the open state and may not perform the operation determination of the automatic door 120. Therefore, such problem that the operation determination value is the negative number when applying Equation 1 may not be caused.

Referring to FIG. 26, when only the slope is reduced from 1/10 to 1/20 while maintaining the same Y-intercept of −55, the calculation equation of the operation determination value may be DIFF=(THR−1100)/20 and the operation determination value may have a negative number. This may cause a problem in determining the operation of the automatic door 120.

In some implementations, when the magnetic field sensor 152 detects the S pole 1431, an output voltage range of the sensor may be 550 AD or more.

Referring to FIG. 27, in this implementation, in order to adjust actual sensitivity to the operation determination of the door 120, a slope of a graph may be adjusted by changing "1/10" to "1/20" without changing the equation in parentheses as shown below. Accordingly, sensitivity to the operation determination of the door 120 can increase.

FIG. 28 is a flowchart illustrating an example of a method of controlling an automatic door using a plurality of magnetic field sensors 152 and 170.

Since other configurations are the same as or similar to those of the implementation of FIGS. 21 to 24, repeated descriptions will be omitted and differences will be mainly described.

The plurality of magnetic field sensors 152 and 170 and the magnet 143 may be disposed in the main body 100 and the door 120, respectively. In some implementations, the two magnetic field sensors 152 and 170 and the two magnets 143 can be disposed in the upper and lower portions of the main body 100 and the door 120, respectively, in a direction facing each other.

When determining whether the door 120 is open or closed (S20), if output voltages SNR1 and SNR2 measured by the two magnetic field sensors 152 and 170 are all equal to or smaller than 552 AD, the controller 192 may determine that the door is in the open state (S27).

When at least one of the output voltages SNR1 and SNR2 is greater than 552 AD, the controller 192 may determine that the door 120 is in the closed state (S21).

SNR1: a current output voltage of the first magnetic field sensor 152 (unit: AD).

SNR2: a current output voltage of the second magnetic field sensor 170 (unit: AD).

Two threshold values THR1 and THR2 may be selected as the output voltages SNR1 and SNR2 at a time when the door 120 is determined to be in the closed state (S22).

THR1: an automatic door operation threshold value of the first magnetic field sensor 152.

THR2: an automatic door operation threshold value of the second magnetic field sensor 170.

Two automatic door operation determination values DIFF1 and DIFF2 may be selected by the following equations (S23).

$$DIFF1=(THR1-550)/10$$

$$DIFF2=(THR2-550)/10$$

DIFF1: an automatic door operation determination value of the first magnetic field sensor 152, DIFF2: an automatic door operation determination value of the second magnetic field sensor 170.

When a difference between the output voltage SNR1, SNR2 of one of the two magnetic field sensors 152 and 170 and the threshold value THR1, THR2 is greater than or equal to the operation determination value DIFF1, DIFF2 (S24), the controller 192 can control the door drive module 123 to operate the automatic door 120, thereby opening the door 120 (S25).

When the difference between the output voltage SNR1, SNR2 of one of the two magnetic field sensors 152 and 170 and the threshold value THR1, THR2 is less than the operation determination values DIFF1, DIFF2, the controller 192 may redetermine whether the door 120 is open or closed (S26).

When it is determined that the door 120 is not in the open state, the process may go back to the step of selecting the operation determination value of the automatic door 120 (S23).

When it is determined that the door 120 is in the open state, the process may go back to the step of stopping the operation detection of the automatic door 120 and determining whether the door is open or closed (S20).

In some implementations, by employing a plurality of magnetic field sensors 152 and 170 along with magnets 143 to assess the operation of the automatic door 120, the determination process can be conducted with higher sensitivity compared to using a single magnetic field sensor and the magnet 143.

Therefore, by incorporating the magnet 143 in the door 120 and the magnetic field sensors 152 and 170 in the main body 100, the magnetic field sensors 152 and 170 can detect the magnet 143 mounted in the door 120. This allows for the detection of the degree of the door 120 pressing without the need for direct contact, thereby enabling a more aesthetically pleasing outer design of the door compared to conventional contact-type.

FIG. 29 is a graph showing an example of an instantaneous change in output voltage due to an external factor.

FIG. 30 is a flowchart illustrating an example of an automatic door control method.

Referring to FIG. 29, the door 120 and the main body 100 may be shaken due to an external factor such as opening and closing of adjacent furniture, a refrigerator door, or the like. Due to this, the distance between the door 120 and the main body 100 may change, which may cause an instantaneous change in output voltage of the magnetic field sensor 152.

For example, when the output voltage instantaneously increases to 750 AD (CASE 1), an operation determination condition (SNR−THR≥DIFF) of the automatic door 120 may be satisfied. This may cause the door 120 to be open without a user's intention. At this time, assuming that the threshold value is 700 AD and the operation determination value is 15 AD, the difference between the output voltage SNR (750 AD) and the threshold value (700 AD) is 50 AD, which is greater than the operation determination value, and thereby the automatic door 120 operates to be opened.

In addition, when the output voltage instantaneously decreases from 700 AD to 650 AD (CASE 2), unexpected opening of the door 120 may not immediately occur. However, when the instantaneously decreased value is saved and updated as a threshold value, the difference (SNR−THR: 50 AD) between a current output voltage SNR (700 AD) and the updated threshold value (650 AD) is greater than the operation determination value DIFF (15 AD). This may cause the automatic door 120 to operate to be opened even though the door 120 is not pressed.

This implementation includes first and second prevention steps of preventing malfunction due to shaking to prevent unexpected opening of the door 120 due to shaking of the door 120 and the main body 100.

For more stable operation determination of the automatic door 120, this implementation may further include an output voltage convergence determination (S91), a threshold value selection (S93), a magnet polarity determination (S94), an operation determination value selection (S941 and S942), a threshold value save (S953), and a threshold value update (S955). Since these steps are the same as or similar to those of the previous implementation of FIGS. 21 to 28, repeated descriptions will be omitted.

In some implementations, in an output voltage convergence determination method, in order to solve a problem that an error in a selection of a threshold value occurs during a transient state of the output voltage of the magnetic field sensor, the output voltage may be measured every preset time T (e.g., 0.1 second) when the door 120 is closed. A preset number N (e.g., 5) of output voltages may be sampled for each step. In each step, when a variation of the output voltage for each preset time is less than or equal to a preset convergence determination voltage value A (e.g., ±5 AD), it may be determined that the output voltage converges. When the variation of the output voltage exceeds the convergence determination voltage value A, it may be determined that the output voltage does not converge (S91). When the output voltage does not converge, the process may go back to the step of determining whether the door is open or closed (S90).

A method of determining the polarity of the magnet 143 for each threshold value will be described as follows.

When the door 120 is closed, the threshold value may be compared with a voltage value for determining a polarity of the magnet (i.e., magnet polarity determination voltage value), for example, 552 AD (S94). When the threshold value exceeds 552 AD, the controller 192 may determine that the polarity of the magnet 143 is the S pole 1431 (S941). The magnet polarity determination voltage value may be a value that is the same as an upper limit voltage value for determining whether the door 120 is open or closed.

In the closed state of the door 120, when the threshold value is 552 AD or less, the controller 192 may determine that the polarity of the magnet 143 is the N pole 1432 (S942).

An operation determination value DIFF of the automatic door 120 for each polarity may be selected (S941 and S942).

Equations for selecting the automatic door operation determination value DIFF for each polarity are as follows.

$$S \text{ pole 1431: DIFF}=(\text{THR}-550)/10 \quad \text{[Equation 1]}$$

$$N \text{ pole 1432: DIFF}=(474-\text{THR})/10 \quad \text{[Equation 2]}$$

DIFF: the operation determination value of the automatic door 120 (unit: AD) and THR: the threshold value (unit: AD).

The method of saving and updating the threshold value will be described as follows.

When the operation determination condition of the automatic door 120 is not satisfied after an initial threshold value is selected, a threshold value save determination may be carried out (S951).

The threshold value save determination (S951) may be carried out by determining whether two seconds have elapsed after it is determined that the operation determination condition of the automatic door 120 is not satisfied. After two seconds (T2) elapses in the threshold value save determination (S951), when a condition of a second prevention step of preventing malfunction due to shaking (S952) is satisfied, the output voltage SNR of the sensor may be saved as the threshold value (S953). When it is determined that two seconds have not elapsed in the threshold value save determination (S951), it may be determined whether the door 120 is open or closed (S98). In the determination as to whether the door 120 is open or closed (S98), when the door is open, an operation detection of the automatic door 120 (detection of the pressed amount of the door 120) may be stopped (S99) and the process may go back to the start (S). When the door 120 is closed, the process may go back to the magnet polarity determination (S94).

After saving the threshold value (S953), a threshold value update determination may be performed (S954).

The threshold value update determination (S954) may be carried out by determining whether two seconds T2 have elapsed after the threshold value is saved.

When it is determined that two seconds have elapsed in the threshold value update determination (S954), a previous threshold value may be updated to the saved threshold value. When it is determined that two seconds have not elapsed in the threshold value update determination (S954), it may be determined whether the door 120 is open or closed (S98). In the determination as to whether the door 120 is open or closed, when the door is open, the operation detection of the automatic door 120 may be stopped (S99) and the process may go back to the start (S). When the door 120 is closed, the process may go back to the magnet polarity determination (S94).

Therefore, the threshold value save and the threshold value update may further be carried out when the operation determination condition, namely, the condition (SNR−THR or IFF), in which the difference between the output voltage and the threshold value is equal to or greater than the operation determination value of the automatic door 120, is not satisfied upon determining the operation of the automatic door 120 after selecting the initial threshold value. Also, the save and update of the threshold value may be determined by determining whether two seconds have elapsed before the save and update of the threshold value. This can solve the problem that the automatic door malfunctions when a previous threshold value is not updated (CASE 1, CASE 2) or the threshold value is immediately updated periodically.

Reference numerals in FIG. 30 will be described as follows.

SNR: a current output voltage of the sensor (unit: AD) (S90).

T1: an output voltage sampling time (0.1 second) (S91).

N: the number of samples for convergence determination (5 pieces) (S91).

A1: a change amount of the output voltage of the sensor for convergence determination (±5 AD) (S91).

THR: an automatic door operation threshold value of the sensor (S93).

DIFF: an automatic door operation determination value of the sensor (S941 and S942).

T2: a threshold value save or update time interval (2 seconds) (S951).

SNRa: an output voltage of the sensor after lapse of 1.9 seconds (S952).

SNRa: an output voltage of the sensor after lapse of 2.0 seconds (S952).

SAVE: a value saved to update the threshold value (S953).

T3: a time of maintaining an automatic door operation determination state (0.2 seconds) (S96).

The first prevention of preventing the malfunction due to shaking may be a step of preventing the malfunction of the door that may occur due to an instantaneous increase in output voltage caused by shaking.

In the first prevention step of preventing the malfunction due to shaking, it may be determined whether an operation determination state of the automatic door 120 is maintained for a predetermined time T3 (e.g., 0.2 seconds) after the operation determination of the automatic door 120 is completed (S96).

The operation determination state of the automatic door 120 may refer to a state of satisfying the condition (SNR−THR≥DIFF) that the difference between the output voltage SNR and the threshold value THR is equal to or greater than the operation determination value DIFF of the automatic door 120.

When the operation determination state of the automatic door 120 is maintained for a first preset time T3 (e.g., 0.2 seconds), the automatic door 120 can operate to be opened.

When the operation determination state of the automatic door 120 is not maintained for the first preset time, it may be redetermined whether the automatic door 120 operates to be opened.

The second prevention of preventing the malfunction due to shaking may be a step of preventing the malfunction of the door that may occur due to an instantaneous decrease in output voltage caused by shaking.

The second prevention step (S952) of preventing the malfunction due to shaking may be carried out before the threshold value save (S953) after the threshold value save determination (S951).

In the second prevention step of preventing the malfunction due to shaking, when a second preset time (e.g., 2.0 seconds) elapses from a time point at which it is determined whether to save the threshold value, it may be determined whether a difference between an output voltage SNRa, which is output when a third preset time (e.g., 1.9 seconds) less than the second preset time elapses from the time point at which it is determined whether to save the threshold value, and an output voltage SNRb, which is output when the second preset time (e.g., 2.0 seconds) elapses from the time point at which it is determined whether to save the threshold value, is equal to or greater than a preset voltage value A2 (e.g., 5 AD) for preventing the malfunction due to shaking (abs(SNRa−SNRb)≤A2) (S952).

The time point at which it is determined whether to save the threshold value (S951) may be a time point at which it is determined that the difference between the output voltage SNR and the threshold value THR is less than the operation determination value DIFF (SNR−THR)<DIFF).

In abs(SNRa−SNRb)≤A2, abs may refer to abbreviation for an absolute value.

When the value of abs(SNRa−SNRb) is 5 AD or less, the threshold value may be saved (S953).

When the value of abs(SNRa−SNRb) exceeds 5 AD, it may be redetermined whether the door 120 is open or closed without saving the threshold value (S98).

Therefore, in some implementations, in the first prevention step of preventing the malfunction due to shaking, the automatic door 120 can operate to be open only when the operation determination state of the automatic door 120 is maintained for a predetermined time. This can prevent the door 120 from being unexpectedly open even though the output voltage is instantaneously increased due to shaking of the door 120 and the main body 100.

Also, in the second prevention step of preventing the malfunction due to shaking, the threshold value can be saved only when the change in (the difference between) the output voltages (the value of abs (SNRa−SNRb)) after determining whether to save the threshold value is equal to or less than the predetermined value A2 (e.g., 5 AD) for a predetermined time (e.g., 0.1 second). This can prevent the door 120 from being unexpectedly open even though the output voltage is instantaneously decreased due to shaking of the door 120 and the main body 100.

FIGS. 31*a* and 31*b* are a flowchart illustrating an example of an automatic door control method.

Since this method is the same as or similar to the previous implementation of FIG. 30 in that the unexpected opening of the door 120 due to shaking of the door 120 and the main body 100 is prevented, redundant descriptions will be omitted.

Reference numerals in FIGS. 31A and 31B will be described as follows.

SNR1: a current output voltage of the first magnetic field sensor 152 (unit: AD) (S100).

SNR2: a current output voltage of the second magnetic field sensor 170 (unit: AD) (S100).

T1: an output voltage sampling time (0.1 second) (S101).

N: the number of samples for convergence determination (5 pieces) (S101).

A: a change amount of the output voltage of the sensor for convergence determination (±5 AD) (S101).

THR1: an automatic door operation threshold value of the first magnetic field sensor 152 (S103).

THR2: an automatic door operation threshold value of the second magnetic field sensor 170 (S103).

DIFF1: an automatic door operation determination value of the first magnetic field sensor 152 (S1041 and S1042).

DIFF2: an automatic door operation determination value of the second magnetic field sensor 170 (S1051 and S1052).

T2: a threshold value save and update time interval (2 seconds) (S1061).

SNR1*a*: an output voltage of the first magnetic field sensor when 1.9 seconds elapse (S1062).

SNR1*b*: an output voltage of the first magnetic field sensor when 2.0 seconds elapse (S1062).

SNR2*a*: an output voltage of the second magnetic field sensor when 1.9 seconds elapse (S1062).

SNR2*b*: an output voltage of the second magnetic field sensor when 2.0 seconds elapse (S1062).

SAVE1: a value saved for updating the threshold value of the first magnetic field sensor 152 (S1063).

SAVE2: a value saved for updating the threshold value of the second magnetic field sensor 170 (S1063).

T3: a time of maintaining an automatic door operation determination state (0.2 seconds) (S107).

The invention claimed is:

1. A refrigerator comprising:

a main body including an inner case defining a storage container, an outer case surrounding the inner case, and an insulator disposed between the inner case and the outer case;

a door rotatably coupled to the main body and configured to open and close the storage container;

a door driver disposed at an upper portion of the main body and configured to, based on the door being pressed, open the door;

a sensor comprising a magnetic field sensor and a magnet and configured to detect an open or closed state of the door and measure a pressed amount of the door based on to a change in a distance between the magnetic field sensor and the magnet; and a controller configured to control the door driver and determine whether the door is to be opened based on to the pressed amount of the door, wherein the controller is configured to:

select, as a threshold value, an output voltage of the magnetic field sensor based on the door being closed, select an operation determination value of the door according to the threshold value, control the door driver to open the door open based on a state being maintained for a first preset time, and determine, based on the state not being maintained for the first preset time, whether the door is to be opened, and wherein a difference between the output voltage of the magnetic field sensor and the threshold value is equal to or greater than the operation determination value in the state, wherein the controller is configured to:

based on a determination that the difference between the output voltage of the magnetic field sensor and the threshold value is less than the operation determination value, determine whether to save the threshold value, based on the difference between the output voltages of the magnetic field sensor after determining whether to save the threshold value being equal to or less than a preset voltage value for a preset time, save the threshold value.

2. The refrigerator of claim 1, wherein the controller is configured to:

compare, based on a second preset time being elapsed from a time point at which it is determined whether to save the threshold value, the preset voltage value with a difference between a first output voltage and a second output voltage, the first output voltage being output when a third preset time less than the second preset time elapses from the time point at which it is determined whether to save the threshold value, and the second output voltage being output when the second preset time elapses from the time point at which it is determined whether to save the threshold value, based on the difference being equal to or less than the preset voltage value, save the threshold value, and based on a fourth preset time being elapsed after saving the threshold value, update the threshold value.

3. The refrigerator of claim 1, wherein the magnetic field sensor is disposed at the main body and the magnet is disposed at the door, and wherein the magnetic field sensor is an analog Hall sensor.

4. The refrigerator of claim 1, wherein the magnet has a first pole and a second pole, and wherein the magnet faces the magnetic field sensor, the first pole facing the magnetic field sensor and the second pole facing an opposite direction relative to the magnetic field sensor.

5. The refrigerator of claim 1, wherein the magnetic field sensor is provided in plurality, the plurality of magnetic field sensor being disposed at an upper portion and a lower portion of the main body, respectively, and wherein the magnet is provided in plurality, the plurality of magnets being disposed at an upper portion and a lower portion of the door, respectively.

6. The refrigerator of claim 1, wherein the storage container comprises:

a refrigerating chamber defined at a first side in the main body, and a freezing chamber defined at a second side in the main body, wherein the door comprises:

a refrigerating chamber door coupled to the first side of the main body and configured to open and close the refrigerating chamber, and a freezing chamber door coupled to the second side of the main body and configured to open and close the freezing chamber, wherein the magnetic field sensor is provided as a single sensor or in plurality on each of the first side and the second side of the main body, and wherein the magnet is provided as a single magnet or in plurality on each of the refrigerating chamber door and the freezing chamber door to face the magnetic field sensor.

7. The refrigerator of claim 1, wherein the magnetic field sensor is disposed at the door, and the magnet is disposed at the main body.

8. A refrigerator comprising:

a main body including an inner case defining a storage container, an outer case surrounding the inner case, and an insulator disposed between the inner case and the outer case;

a door rotatably coupled to the main body and configured to open and close the storage container;

a door driver disposed at an upper portion of the main body and configured to, based on the door being pressed, open the door;

a sensor comprising a magnetic field sensor and a magnet and configured to detect an open or closed state of the door and measure a pressed amount of the door based on to a change in a distance between the magnetic field sensor and the magnet; and a controller configured to control the door driver and determine whether the door is to be opened based on to the pressed amount of the door, wherein the controller is configured to:

select, as a threshold value, an output voltage of the magnetic field sensor based on the door being closed, select an operation determination value of the door according to the threshold value, control the door driver to open the door open based on a state being maintained for a first preset time, and determine, based on the state not being maintained for the first preset time, whether the door is to be opened, and wherein a difference between the output voltage of the magnetic field sensor and the threshold value is equal to or greater than the operation determination value in the state, wherein the controller is configured to:

determine whether the door is to be opened by comparing (i) a difference between an output voltage of the magnetic field sensor when the door is pressed and the threshold value with (ii) the operation determination value, based on the difference between the output voltage of the magnetic field sensor when the door is pressed and the threshold value being equal to or greater than the operation determination value, control the door driver to open the door, and based on the difference between the output voltage of the magnetic field sensor when the door is pressed and the threshold value being less than the operation determination value, determine whether the door is opened or closed.

9. A refrigerator comprising:

a main body including an inner case defining a storage container, an outer case surrounding the inner case, and an insulator disposed between the inner case and the outer case;

a door rotatably coupled to the main body and configured to open and close the storage container;

a door driver disposed at an upper portion of the main body and configured to, based on the door being pressed, open the door;

a sensor comprising a magnetic field sensor and a magnet and configured to detect an open or closed state of the door and measure a pressed amount of the door based on to a change in a distance between the magnetic field sensor and the magnet; and a controller configured to control the door driver and determine whether the door is to be opened based on to the pressed amount of the door, wherein the controller is configured to:

select, as a threshold value, an output voltage of the magnetic field sensor based on the door being closed, select an operation determination value of the door according to the threshold value, control the door driver to open the door open based on a state being maintained for a first preset time, and determine, based on the state not being maintained for the first preset time, whether the door is to be opened, and wherein a difference between the output voltage of the magnetic field sensor and the threshold value is equal to or greater than the operation determination value in the state, wherein the controller is configured to:

compare the output voltage of the magnetic field sensor with a preset voltage value to determine whether the door is opened or closed, based on the output voltage being equal to or greater than the preset voltage value, determine that the door is closed, and based on the output voltage being less than the preset voltage value, determine that the door is opened.

10. A refrigerator comprising:

a main body including an inner case defining a storage container, an outer case surrounding the inner case, and an insulator disposed between the inner case and the outer case;

a door rotatably coupled to the main body and configured to open and close the storage container;

a door driver disposed at an upper portion of the main body and configured to, based on the door being pressed, open the door;

a sensor comprising a magnetic field sensor and a magnet and configured to detect an open or closed state of the door and measure a pressed amount of the door based on to a change in a distance between the magnetic field sensor and the magnet; and a controller configured to control the door driver and determine whether the door is to be opened based on to the pressed amount of the door, wherein the controller is configured to:

select, as a threshold value, an output voltage of the magnetic field sensor based on the door being closed, select an operation determination value of the door according to the threshold value, control the door driver to open the door open based on a state being maintained for a first preset time, and determine, based on the state not being maintained for the first preset time, whether the door is to be opened, and wherein a difference between the output voltage of the magnetic field sensor and the threshold value is equal to or greater than the operation determination value in the state, wherein the controller is configured to:

based on a determination that the door is closed, compare a variation of an output voltage measured every preset time with a preset convergence determination voltage value, based on the variation of the output voltage being equal to or less than the convergence determination voltage value, determine that the output voltage converges, and select the converged output voltage as the threshold value.

* * * * *